(12) United States Patent
Gupta et al.

(10) Patent No.: US 11,854,418 B2
(45) Date of Patent: Dec. 26, 2023

(54) COLLISION AWARENESS USING HISTORICAL DATA FOR VEHICLES

(71) Applicant: Honeywell International Inc., Charlotte, NC (US)

(72) Inventors: Vipul Gupta, Chandler, AZ (US); Lawrence J. Surace, Phoenix, AZ (US); Sujaya Rao, Banglore (IN); Rajesh Chenchu, Hyderabad (IN); Siva Prasad Kolli, Hyderabad (IN); Vinod Prakash Singh, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 306 days.

(21) Appl. No.: 17/070,830

(22) Filed: Oct. 14, 2020

(65) Prior Publication Data
US 2021/0256858 A1 Aug. 19, 2021

(30) Foreign Application Priority Data
Feb. 14, 2020 (IN) .............................. 202011006508

(51) Int. Cl.
*G08G 5/04* (2006.01)
*G08G 5/00* (2006.01)
(Continued)

(52) U.S. Cl.
CPC ........... *G08G 5/045* (2013.01); *G08G 5/0013* (2013.01); *G08G 5/0043* (2013.01); *G08G 5/065* (2013.01); *H04W 4/42* (2018.02)

(58) Field of Classification Search
CPC .... G08G 5/045; G08G 5/0013; G08G 5/0043; G08G 5/065; G08G 5/0026; G08G 5/0082; H04W 4/42; H04W 4/40
See application file for complete search history.

(56) References Cited

U.S. PATENT DOCUMENTS 5,325,302 A 6/1994 Izidon et al.
5,867,804 A 2/1999 Pilley et al.
(Continued)

FOREIGN PATENT DOCUMENTS

BR 102013029798 A2 10/2014
CN 104916168 A 9/2015
(Continued)

OTHER PUBLICATIONS

U.S. Appl. No. 16/775,148, by Honeywell International Inc. (Inventors: Kanagarajan et al.), filed Jan. 28, 2020.
(Continued)

*Primary Examiner* — Frederick M Brushaber
(74) *Attorney, Agent, or Firm* — Shumaker & Sieffert, P.A.

(57) ABSTRACT

This disclosure is directed to methods, computer program products, and systems for providing surface vehicle tracking data, including indications of potential collision zones, to an airport map display system onboard an aircraft. In one example, a method includes identifying historical navigation route data, aerodrome guidance features, and a predicted path of a first vehicle. The method further includes determining predicted positions along the predicted path and determining predicted positions of a second vehicle and comparing vehicle envelopes for the two vehicles to determine a predicted collision zone of the vehicles.

20 Claims, 9 Drawing Sheets

(51) Int. Cl.
*G08G 5/06* (2006.01)
*H04W 4/42* (2018.01)

(56) References Cited

U.S. PATENT DOCUMENTS

| | | | |
|---|---|---|---|
| 6,118,401 | A | 9/2000 | Tognazzini |
| 9,047,771 | B1 | 6/2015 | Thoreen et al. |
| 9,243,930 | B2 | 1/2016 | Bushnell |
| 9,633,567 | B1 | 4/2017 | Skoog et al. |
| 9,836,661 | B2 | 12/2017 | Zhou et al. |
| 9,847,034 | B1 | 12/2017 | Plawecki |
| 9,881,508 | B2 | 1/2018 | Silver |
| 10,096,256 | B2 | 10/2018 | Rutkiewicz et al. |
| 10,106,153 | B1 * | 10/2018 | Xiao .................. G06F 18/24 |
| 11,557,213 | B1 * | 1/2023 | Curlander .............. G08G 5/006 |
| 2002/0093433 | A1 | 7/2002 | Kapadia et al. |
| 2004/0026574 | A1 | 2/2004 | Seifert |
| 2010/0109936 | A1 | 5/2010 | Levy |
| 2010/0219988 | A1 | 9/2010 | Griffith |
| 2010/0231721 | A1 | 9/2010 | Meloche et al. |
| 2012/0075461 | A1 | 3/2012 | Yu et al. |
| 2012/0136562 | A1 | 5/2012 | Mere et al. |
| 2013/0110323 | A1 | 5/2013 | Knight |
| 2013/0321176 | A1 | 12/2013 | Vasek et al. |
| 2014/0142838 | A1 | 5/2014 | Durand |
| 2016/0071422 | A1 | 3/2016 | Bazawada et al. |
| 2016/0171898 | A1 | 6/2016 | Silver |
| 2016/0171899 | A1 | 6/2016 | Depare et al. |
| 2016/0196754 | A1 | 7/2016 | Surace |
| 2017/0178520 | A1 | 6/2017 | Papageorgiou et al. |
| 2018/0301043 | A1 | 10/2018 | Rutkiewicz et al. |
| 2018/0308370 | A1 * | 10/2018 | Buchmueller ......... G08G 5/045 |
| 2019/0043374 | A1 | 2/2019 | Mere |
| 2019/0146083 | A1 | 5/2019 | Pesik et al. |
| 2019/0228668 | A1 | 7/2019 | Wang et al. |
| 2019/0381977 | A1 | 12/2019 | Kanagarajan et al. |
| 2020/0027363 | A1 | 1/2020 | Vana et al. |
| 2020/0302808 | A1 | 9/2020 | Chen et al. |
| 2022/0392355 | A1 * | 12/2022 | Holmes .................. G01C 21/20 |
| 2023/0038694 | A1 * | 2/2023 | Foo ........................ G08G 5/045 |

FOREIGN PATENT DOCUMENTS

| | | | |
|---|---|---|---|
| JP | 2015228101 | A * | 12/2015 |
| WO | 2018152960 | A1 | 8/2018 |
| WO | WO-2021091874 | A1 * | 5/2021 |

OTHER PUBLICATIONS

U.S. Appl. No. 16/009,852, filed Jun. 15, 2018, naming inventors Kanagarajan et al.
U.S. Appl. No. 16/459,411, by Honeywell International Inc. (Inventors: Govindillam et al.), filed Jul. 1, 2019.
Ibrahim, "Development of a Flight Collision Avoidance System for a Free Flight Environment: An Ecological Interface Design Approach," International Journal of Multidisciplinary and Current Research, ISSN: 2321-3124, Nov./Dec. 2013, 14 pp.
"Wing Tip Clearance Hazard," accessed from https://www.skybrary.aero/index.php/Wing_Tip_Clearance_Hazard, last edit to web page made Jun. 23, 2019, 8 pp.
U.S. Department of Transportation, "Surface Movement Guidance and Control System," Advisory Circular, AFS-400, Dec. 19, 1996, 62 pp.
Besada et al., "Image-Based Automatic Surveillance for Airport Surface," Jan. 2001, 9 pp.
Extended Search Report from counterpart European Application No. 21154155.2, dated Jul. 13, 2021, 8 pp.
Response to Extended Search Report dated Jul. 13, 2021 from counterpart European Application No. 21154155.2, filed Sep. 16, 2021, 19 pp.

* cited by examiner

COLLISION AWARENESS USING HISTORICAL DATA FOR VEHICLES

This application claims priority to Indian Provisional Application 202011006508, filed Feb. 14, 2020, the entire content of which is hereby incorporated by reference.

This disclosure relates to collision awareness for vehicles.

BACKGROUND

As commercial aviation traffic has continued to increase over the years, airports have grown increasingly busy. As such, collision avoidance systems have been implemented that help prevent potential collisions of an aircraft with another aircraft using various sensors, imaging devices, radar, and other hardware components installed on an aircraft. Such hardware components increase the weight, maintenance complexity, and in general, overall cost, for such vehicles.

An increasing amount of air traffic has also involved very large airliners with very long wingspans, which may sometimes reduce wingtip clearance margins while the aircraft is in motion on airport ground surfaces. In addition, multiple aircraft in an area may be powered down at any given time or otherwise, not emitting a tracking beacon that may be used to reduce the likelihood of collision with another vehicle. An aircraft may be powered down and pulled under tug by a tug vehicle, in which case, aircraft ground collisions or collisions between aircraft and other vehicles may be even more likely to occur. Furthermore, in areas of an aerodrome where aircraft or aircraft tug vehicles navigate unmarked routes, such as in an airport apron area or hangar bay, wingtip collisions may occur at an even higher rate due to the seemingly unrestricted route an aircraft or tug vehicle can take to reach an intended destination.

SUMMARY

This disclosure is directed to methods, systems, and computer program products for predicting potential collision zones of vehicles at prospective times using historical vehicle data, clearance information for one or more vehicles, and/or aerodrome guidance features. In some examples, a vehicle may transmit a current location of the vehicle to a user interface (UI) device (e.g., an electronic flight bag (EFB)) or to a remote data server (e.g., a cloud-based data server). The remote data server or EFB may predict the potential collision zone using one or more of the historical navigation route data, clearance information for one or more vehicles, and/or aerodrome guidance features and provide an indication of the potential collision zone to a user. The historical navigation route data may be based on transponder positional data and stored in a database of historical vehicle data. In addition, the aerodrome guidance features may include data stored in a database that provides information as to the location of guidance markings, such as guidance lines painted on a surface, guidance signs, building features, and other information that provide guidance to vehicles throughout a particular aerodrome location. A collision awareness system may predict routes using the historical navigation route data and aerodrome guidance features and predict vehicle positions along the route to determine potential collision zones. In some instances, the collision awareness system may provide the potential collision zone data for display on an EFB, such as on an airport moving map display (AMMD) application executing on the EFB.

In some examples, surface vehicle tracking systems may be used to determine airport surface transient object data using, for example, multilateration sensors or other airport system sensors. This data may be used to confirm or verify the prediction of the collision awareness system predicted potential collision zones using one or more of the historical navigation route data, clearance information for one or more vehicles, and/or aerodrome guidance features. Some transient ground objects or types of transient ground objects may not or may not be actively transmitting messages or signals that may be received by certain types of multilateration sensors or other airport system sensors, or may not respond to certain types of interrogation signals transmitted by multilateration sensors or other airport system sensors, such as if the airport system sensors use cooperative surveillance with which objects other than aircraft are not typically configured to cooperate. In some examples, a transient aircraft may be pulled via an aircraft tug (e.g., a tug vehicle that transports other vehicles). In such instances, the aircraft being pulled may be powered down at the time, such that the aircraft does not transmit signals that may be used to track the vehicle location. In addition, the vehicles may be in areas of an aerodrome that provide less guidance to vehicles via aerodrome guidance features. For example, an apron area of an airport may not include painted guidance features on the surface that may be referenced in an aerodrome guidance database. As such, complex maneuvering and high traffic areas in various aerodrome locations increases the likelihood of potential vehicle collision (e.g., wingtip collisions, etc.).

In accordance with various techniques of this disclosure, a collision awareness system may utilize one or more of the historical navigation route data and/or aerodrome guidance features to predict potential collision zones between vehicles. In addition, the collision awareness system may utilize vehicle clearance information, such as clearance information from an air traffic controller (ATC), to predict potential collision zones between vehicles traversing a surface, where at least one vehicle is moving, either by tug or not. In some examples, the collision awareness system may execute on a remote server that collects data, such as positions of vehicles, updates databases, and predict collision zones. In another example, the collision awareness system may execute at least in part on an EFB or other user interface device.

In some examples, the collision awareness system may receive clearance information in the form of text or voice, process the clearance information, and determine navigational information for a vehicle or predict, based on the clearance information, a current position of a vehicle. For example, if a vehicle receives clearance information to a particular gate of an apron area, but then powers down the avionics system of the vehicle, the collision awareness system may determine how much time has passed since the vehicle received the clearance information, how much time historically a vehicle would take to arrive at a destination point or another target mark on a path toward the destination point, and predict a location of the vehicle at any particular point in time. In any event, collision awareness system may use the historical navigation route data and the aerodrome guidance features to predict a location of the vehicle, predict a trajectory of the vehicle and predict trajectories of other vehicles to determine whether an overlap between an envelope of two or more vehicles indicates a potential collision at a prospective or future time.

In this way, a collision awareness system may be implemented without requiring additional hardware installation on an aircraft and may provide reliable indications as to predicted collision zones in an aerodrome by leveraging particular computing systems to overlay data, such as aerodrome surface data overlaid with historical navigation route data. In addition, the collision awareness system may leverage machine learning models to provide such predictions trained on particular data inputs that allow continuous modeling and updating of predicted routes as a vehicle traverses the route. For example, a collision awareness system may predict a route of a first vehicle, but as the first vehicle starts traveling the predicted route, may determine an updated predicted route of the first vehicle, such as based on data received from the vehicle (e.g., speed information, position information, etc.), thereby allowing the collision awareness system to provide dynamic predictions on the fly as objects are moving throughout the aerodrome and as historical navigation route data evolves with ever changing conditions. Furthermore, the collision awareness system may predict collision zones based on aircraft specifics and aerodrome specifics while referencing both general and specific information derived from multiple vehicle types and aerodrome locations.

In one example, a method includes obtaining, by processing circuitry of a ground collision awareness system, historical navigation route data for one or more reference vehicles, the historical navigation route data being based on transponder positional data. The method further includes identifying, by the processing circuitry, a plurality of aerodrome guidance features for a particular aerodrome location, the aerodrome guidance features including guidance marker information. The method further includes determining, by the processing circuitry, a predicted path of a first vehicle, the predicted path comprising a first portion and a second portion, the first portion of the predicted path being predicted using the guidance marker information, and the second portion of the predicted path being predicted using the historical navigation route data. The method further includes determining, by the processing circuitry, a predicted position of the first vehicle along the predicted path at a prospective time. The method further includes determining, by the processing circuitry, a predicted position of a second vehicle with respect to approximately the same prospective time. The method further includes performing, by the processing circuitry, a comparison of a first vehicle envelope for the first vehicle and a second vehicle envelope for the second vehicle at the predicted positions. The method further includes identifying, by the processing circuitry, an overlap of the first vehicle envelope and the second vehicle envelope. The method further includes and determining, by the processing circuitry, a predicted collision zone of the first vehicle and the second vehicle at the prospective time based at least in part on the overlap of the first vehicle envelope and the second vehicle envelope.

In another example, a ground collision awareness system comprising a processor and a memory is disclosed. The memory is configured to store: historical navigation route data for one or more reference vehicles, wherein the historical navigation route data are based on transponder positional data, and a plurality of aerodrome guidance features for one or more aerodrome locations, wherein the aerodrome guidance features include guidance marker information. The processor of the ground collision awareness system is configured to determine a predicted path of a first vehicle, the predicted path comprising a first portion and a second portion, the first portion of the predicted path being predicted using the guidance marker information, and the second portion of the predicted path being predicted using the historical navigation route data; determine a predicted position of the first vehicle along the predicted path at a prospective time; determine a predicted position of a second vehicle with respect to approximately the same prospective time; perform a comparison of a first vehicle envelope for the first vehicle and a second vehicle envelope for the second vehicle at the predicted positions; identify an overlap of the first vehicle envelope and the second vehicle envelope; and determine a predicted collision zone of the first vehicle and the second vehicle at the prospective time based at least in part on the overlap of the first vehicle envelope and the second vehicle envelope.

In another example, a non-transitory computer-readable storage medium having stored thereon instructions is disclosed. The instructions, when executed, cause one or more processors to: obtain historical navigation route data for one or more reference vehicles, the historical navigation route data being based on transponder positional data; identify a plurality of aerodrome guidance features for a particular aerodrome location, the aerodrome guidance features including guidance marker information; determine a predicted path of a first vehicle, the predicted path comprising a first portion and a second portion, the first portion of the predicted path being predicted using the guidance marker information, and the second portion of the predicted path being predicted using the historical navigation route data; determine a predicted position of the first vehicle along the predicted path at a prospective time; determine a predicted position of a second vehicle with respect to approximately the same prospective time; perform a comparison of a first vehicle envelope for the first vehicle and a second vehicle envelope for the second vehicle at the predicted positions; identify an overlap of the first vehicle envelope and the second vehicle envelope; and determine a predicted collision zone of the first vehicle and the second vehicle at the prospective time based at least in part on the overlap of the first vehicle envelope and the second vehicle envelope.

The disclosure is also directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages will be apparent from the description and drawings, and from the claims.

DETAILED DESCRIPTION

Various examples are described below generally directed to methods, computer program products, and electronic systems that may provide collision awareness data, including indications of potential collision zones, from a collision awareness system. The collision awareness system may provide such data over a wireless network to an application (e.g., an airport moving map display (AMMD) application) onboard an aircraft. For example, the collision awareness system may provide such indications of potential collision zones on an electronic flight bag (EFB), which may be implemented on a tablet computer or analogous user interface device. The flight crew may view and use the AMMD enhanced with the information from the collision awareness system while the pilot controls the aircraft on the airport ground surface, for example, during taxiing, parking, etc. In some examples, a tug operator may view and use the AMMD enhanced with the information from the collision awareness system while tugging an aircraft to a destination location according to ATC clearance information. The collision awareness system may determine potential collision zones with one or more other surface vehicles (e.g., other aircraft or ground vehicles) and transmit warnings of the potential collision zones to the EFB. Implementations of this disclosure may thus provide better situational awareness for controlling ground movement of aircraft on airport taxiways, including in weather conditions of limited visibility, without the need for any new hardware to be installed in the aircraft itself (and thus, without the need for new hardware to be certified by relevant aviation authorities), and without requiring cooperative participation by other aircraft. Implementations of this disclosure may not only decrease the possibility of collision of an aircraft with another aircraft or surface vehicle, but may also provide additional benefits for the airport, such as smoother taxiing and fewer interruptions or delays due to confusion or lack of situational awareness in the ground traffic.

Figure 1:
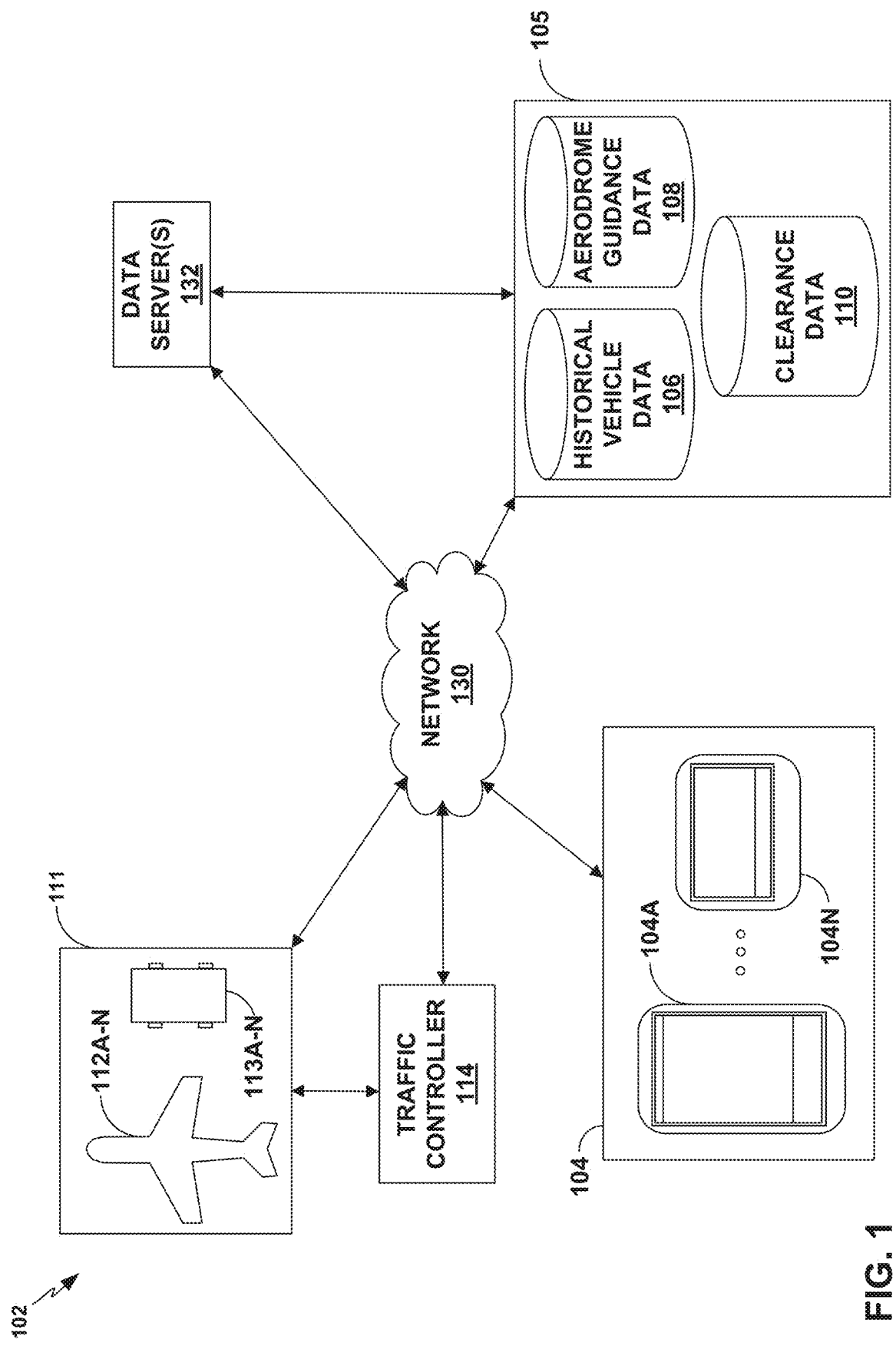
FIG. 1 is a conceptual block diagram depicting an example collision awareness system interfacing with various components to determine predicted collision zones of vehicles, in accordance with aspects of this disclosure.

FIG. 1 is a conceptual block diagram depicting example components of a collision awareness system environment 102. A collision awareness system may operate in such an example collision awareness system environment 102, including various example components of FIG. 1. In the illustrated example, the collision awareness system environment 102 is includes various components, including surface and/or flight vehicles 111, a traffic controller 114, one or more data server(s) 132, various databases or datastores 105, and user interface devices 104. As such, a collision awareness system may be implemented as software installed on one or more of the components of collision awareness system environment 102.

While vehicles 112A-N may be referred to at times as being airplanes of various configurations, the techniques of this disclosure are not so limited, and vehicles 112A-N may include other vehicles, such as helicopters, hybrid tilt-rotor aircrafts, urban air vehicles, jet, quadcopters, hovercrafts, space shuttles, uncrewed aerial vehicle (UAV), flying robots, etc. In addition, while vehicles 113A-N may be referred to at times as being tug vehicles, the techniques of this disclosure are not so limited, and vehicles 113A-N may include other vehicles, such as unmanned ground vehicles, transient ground surface vehicles, unmanned tug vehicles (e.g., remote control vehicles), luggage cart vehicles having multiple cars attached via linkages, refueler trucks, airport busses, container loaders, belt loaders, catering vehicles, emergency vehicles, snow removal vehicles, or ground maintenance equipment, etc. In some examples, vehicles 111 may receive direct communications from traffic controller 114, such as via radio or cellular communication. For example, traffic controller 114 may transmit clearance information directly to one of aircraft 112 or to a tug vehicle 113, indicating a destination port for parking an aircraft.

In some examples, user interface devices 104A-104N may include a wide variety of user interface devices. For example, user interface devices 104 may include tablet computers, laptop computers, phones, EFBs, augmented reality headsets or virtual reality headsets, or other types of user interface devices. User interface devices 104 may be configured to receive surface vehicle movement data with indications of potential collision zones from a collision awareness system. User interface device 104 may also be configured to generate (e.g., render) and present an AMMD that shows transient surface vehicles and indications of potential collision zones, in accordance with illustrative aspects of this disclosure, such as those of FIGS. 5A-5C.

Network 130 may include any number of different types of network connections, including satellite connections and Wi-Fi™ connections. For example, network 130 may include networks established using geosynchronous satellites 105A, low-earth orbit satellites 105B, global navigation satellite systems 105C, cellular base station transceivers 160 (e.g., for 3G, 4G, LTE, and/or 5G cellular network access), and/or Wi-Fi™ access points. In turn, the geosynchronous satellites 105A and low-earth orbit satellites 105B can communicate with gateways that provide access to network 130 for one or more devices implementing the collision awareness system. Cellular base station transceivers can have connections that provide access to network 130. In addition, global navigation satellite systems can communicate directly with vehicles 111, for example to triangulate (or otherwise compute) a current location of vehicles 111. These various satellite, cellular, and Wi-Fi network connections can be managed by different third-party entities, referred to herein as "carriers." In some examples, network 130 may include a wired system. For example, network 130 may include an ethernet system, such as a redundant ethernet system shown in FIG. 7 of this disclosure. In some examples, network 130 may include a multilateration system local area network (LAN), such as the multilateration system LAN shown in FIG. 7 of this disclosure.

In some examples, any one of devices of collision awareness system environment 102 executing one or more techniques of a collision awareness system may be configured to communicate with any one of the various components via network 130. In other instances, a single component of collision awareness system environment 102 may be configured to execute all techniques of the collision awareness system. For example, collision awareness system may include a system that resides on vehicles 111, data server(s) 132, traffic controller 114, or user interface devices 104A/104N. In some examples, collision awareness system may operate as part of a software package installed on one or more computing devices. For example, traffic controller 114 may operate software that executes one or more of the various techniques of the disclosed collision awareness system. For example, a software version of collision awareness system may be installed on a computing device of traffic controller 114. Likewise, the disclosed collision awareness system may be included with user interface devices 104 or one or more data server(s) 132. For example, data server(s) 132 may include a cloud-based data server that implements the disclosed collision awareness system.

In some examples, one or more data server(s) 132 may be configured to receive input data from network 130 (e.g., vehicle positional data, aerodrome guidance features, clearance information, etc.), determine a predicted collision zone, in accordance with one or more techniques of this disclosure, and may output predicted collision zone data to one or more components of FIG. 1, such as user interface devices 104, traffic controller 114, or vehicles 111. In some examples, data server(s) 132 may include datastores 105. In other examples, some or all of datastores 105 may be embodied as separate devices that interface with other components of collision awareness system environment 102 directly or via network 130. For example, where collision awareness system is implemented at least in part on one or more of data server(s) 132, datastores 105 may interface with data server(s) 132 directly or via network 130.

In some examples, the databases may include historical vehicle data 106, aerodrome guidance data 108, and in some instances, clearance data 110. Although shown as being a single datastore 105, the databases shown as part of datastore 105 may be embodied as separate objects. In some examples, a database included with a vehicle or external to the vehicle may be or include a key-value data store, such as an object-based database or dictionary. In a non-limiting example, a database may include any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, extensible markup language (XML) files, TeXT (TXT) files, flat files, spreadsheet files, and/or any other widely used or proprietary format for data storage. For example, the historical navigation route data may be laid out as individual, structured XML segments.

Databases are typically stored in one or more data stores. Accordingly, each database referred to herein (e.g., in the description herein and/or the figures of the present application) is to be understood as being stored in one or more data stores. In various examples, outgoing requests and/or incoming responses may be communicated in any suitable formats. For example, XML, JSON, and/or any other suitable formats may be used for API requests and responses or otherwise. As described herein, data transfer refers to both transmitting data from one of vehicles 111, traffic controller 114, data server(s) 132, or user interface devices 104 over network 130 and receiving data at user interface devices 104, data server(s) 132, traffic controller 114, or vehicles 111, over network 130. The data transfer may follow various formats, such as a database format, files, XML, HTML, RDF, JSON, a file format that is proprietary to the system, data object format, or any other format, and may be encrypted or have data of any available type.

In some examples, historical vehicle data 106 may store historical navigation route data, vehicle data (e.g., maintenance logs, safe zone envelope data, etc.). An example visual depiction of certain historical navigation route data may be as shown in Table 1 below.

TABLE 1

| Speed | Latitude | Longitude | Epoch time | Real time |
|-------|----------|-----------|------------|-----------|
| 10 | 41.97267 | −87.89229 | 1496021663 | 1:34:23 |
| 11 | 41.97268 | −87.89236 | 1496021664 | 1:34:24 |
| 10 | 41.97266 | −87.8924  | 1496021665 | 1:34:25 |
| 9  | 41.97268 | −87.89246 | 1496021666 | 1:34:26 |
| 13 | 41.9727  | −87.89256 | 1496021667 | 1:34:27 |
| 8  | 41.97268 | −87.89257 | 1496021668 | 1:34:28 |
| 10 | 41.97268 | −87.89264 | 1496021669 | 1:34:29 |
| 9  | 41.97266 | −87.89269 | 1496021670 | 1:34:30 |
| 11 | 41.97267 | −87.89278 | 1496021671 | 1:34:31 |
| 11 | 41.97265 | −87.89284 | 1496021672 | 1:34:32 |

The historical navigation route data for one data set may correspond to data obtained for a particular one of vehicles 111. For example, the above Table 1 may include data with respect to a particular one of vehicles 111, such as vehicle 112A or vehicle 113A. In addition, the historical navigation route data may be with respect to a particular location, such as a particular aerodrome location. As such, historical navigation route data may include additional data entries for 'vehicle IDs' and 'airport identifiers.' In any event, the above table is merely one example representation of certain historical navigation route data that database 105 may manage and store over time. The navigation route data may be based on data received directly from each aircraft, such as from transponder data, or may include tracking data obtained otherwise, such as through external sensors. In some examples, data entries related to 'speed' as shown may be related to ground speed. Historical vehicle data 106 may store speed in any suitable unit, such as nautical miles per hour, meters per second, etc. Historical vehicle data 106 may also store acceleration data as determined from the velocity data or as received directly from one of vehicles 111 or external sensors.

In some examples, aerodrome guidance data 108 may include maps or other data representations of a ground surface of an airport, including guidance features configured to guide a vehicle through a particular aerodrome location. The ground surface can be, for example, a taxiway, runway, gate area, apron, hangar bays, or other trafficway or ground surface of an airport. For purposes of this disclosure, description of an "airport" may apply equivalently to an airbase, an airfield, or any other type of permanent or temporary aerodrome. In some examples, aerodrome guidance data 108 may include multiple databases specific to a particular aerodrome or multiple aerodromes within a certain vicinity. For example, aerodrome guidance data 108 may include a fixed ground object database specific to the airport, including real-time or recent-time imaging or detection, or a combination of the two, to provide fixed ground object information and provide aerodrome guidance features, such as guidance line coordinates fixed to the surface of an aerodrome. In any event, data server(s) 132 or other components of collision awareness system environment 102 may be configured to access one or more of aerodrome guidance data 108. For example, data server(s) 132 may identify a particular aerodrome location, such as a particular airport in a particular city, and access aerodrome guidance data 108 specific to the identified aerodrome location. In some examples, aerodrome guidance data 108 for multiple aerodromes may be included in a single datastore 105, rather than in separate datastores 105 as may be the case in some examples.

In some examples, datastore 105 may further include clearance data 110. In some examples, clearance data 110 may be included as a separate datastore 105. For example, clearance data 110 may reside with a datastore stored on a computing system of traffic controller 114. For example, traffic controller 114 of a particular aerodrome may include clearance data 110. Traffic controller 114 may further include other data included with datastores 105. Clearance data 110 may include text or audible clearance information generated by traffic controller 114 and/or vehicle 111, as with communications between traffic controller 114 and a receiving vehicle 111.

In some examples, traffic controller 114 may transmit taxiway or runway clearance information to one of vehicles 111 in either text format or voice message. In some examples, one of vehicles 111 may retrieve the taxiway or runway clearance information from traffic controller 114. For example, one of vehicles 111 may perform a database query for clearance data 110 or otherwise request clearance data 110 from traffic controller 114 or a datastore 105 storing clearance data 110. In some examples, the text or voice message may be directly transmitted to one of vehicles 111 from traffic controller 114 (e.g., live communication or from a clearance database 110). One of vehicles 111 may then transmit the clearance information to one or more external systems (e.g., cloud systems) via an Aircraft Data Gateway Communication Unit (ADG). For example, vehicle 111 or traffic controller 114 may transmit clearance information to a device executing the collision awareness system.

In various scenarios, traffic controller 114 may send a duplicate copy of clearance message (text or voice message) to data server(s) 132 (e.g., a cloud system) via a secured communication protocol. Once the data is available on data server(s) 132, data server(s) 132 may convert any voice related taxiway or runway clearance information to text information and store the clearance information to a predefined location of datastore 105.

A collision awareness system implemented on one or more components of collision awareness system environment 102 may utilize data from datastores 105 to determine predicted collision zones of vehicles. In this way, the collision awareness system may help mitigate or reduce collisions between vehicles 111 (involving body, wingtip, or other portion of vehicles 111) and other aircraft, ground vehicles, or other transient or moving objects on an airport ground surface (collectively, "transient surface objects") while aircraft 112 is taxiing, taking off, landing, or stationary, on the airport ground surface. For purposes of this disclosure, "transient surface objects" may refer to any aircraft, ground vehicles, or other objects on airport ground surfaces, including objects that are permanently fixed in place, and that a collision awareness system may monitor.

Figure 2:
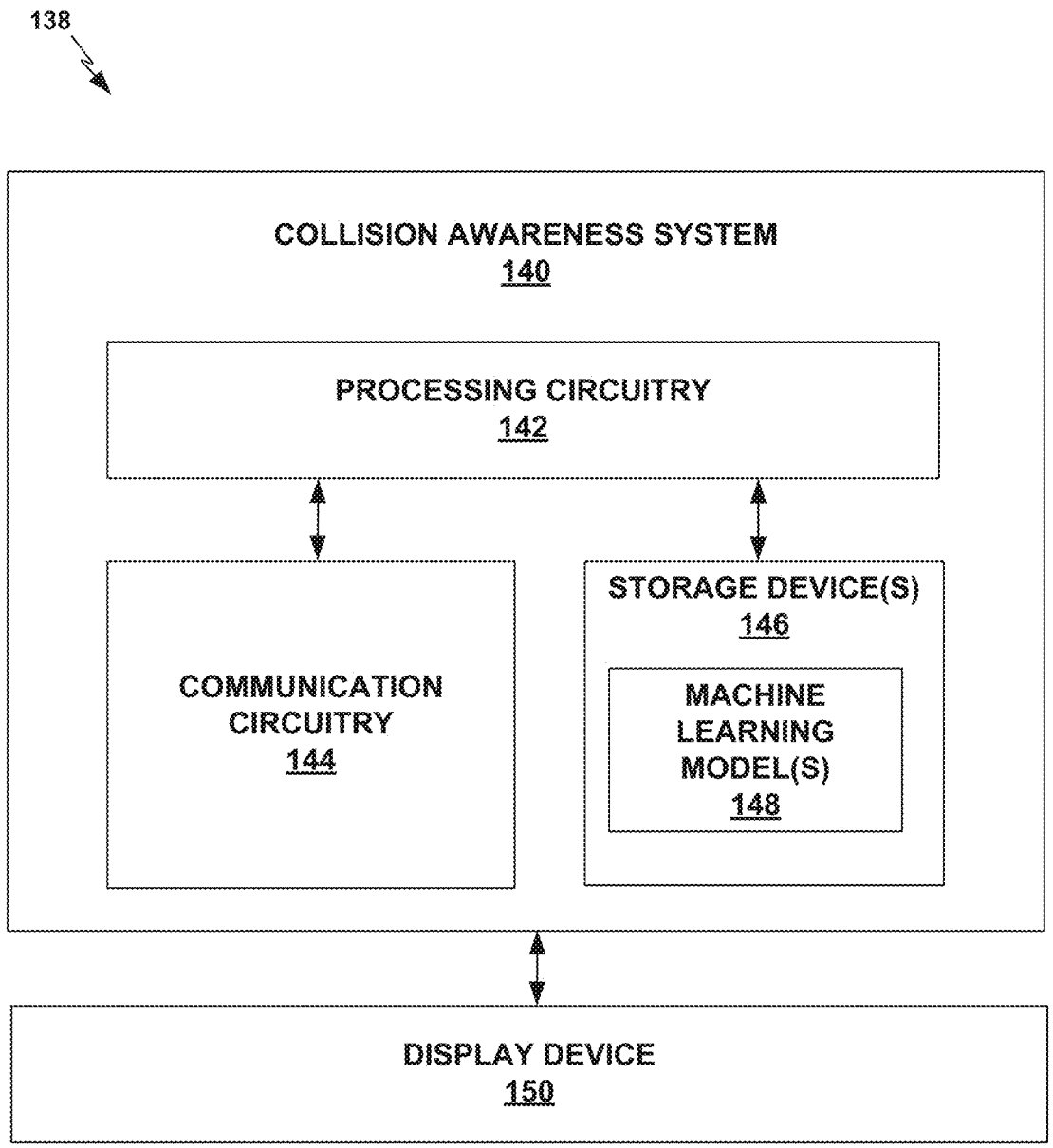
FIG. 2 is a conceptual block diagram for an example computing system with an example computer-executable collision awareness system, in accordance with aspects of this disclosure.

FIG. 2 is a conceptual block diagram for an example computing system 138 with an example computer-executable collision awareness system 140. As described with reference to FIG. 1, collision awareness system 140 may be embodied in any number of different devices, such as one or more of the components of collisions awareness system environment 102 described with reference to FIG. 1. For sake of simplicity, computing system 138 implementing collision awareness system 140 may be described as executing various techniques of this disclosure across one or more data server(s) 132, such as executing on a cloud server. It will be understood, however, that computing system 138 may be implemented on traffic controller 114, user interface device(s) 104, vehicles 111, or other network devices designed to provide vehicle collision awareness. That is, collision awareness system 140 may execute on any one or more of processing circuitry 142 of computing devices corresponding to a traffic controller 114, user interface device(s) 104, vehicles 111, or other network devices, and combinations thereof. In addition, collision awareness system 140 may execute based on data from storage device(s) 146 included with any one or more of processing circuitry 142 of computing devices corresponding to a traffic controller 114, user interface device(s) 104, vehicles 111, or other network devices, and/or data stores 105, in cases where one or more of databases 106, 108, or 110 are implemented as storage devices separate from storage device(s) 146. In some examples, storage device(s) 146 may include one or more of databases 106, 108, or 110.

As such, computing system 138 may implement collision awareness system 140 via processing circuitry 142, communication circuitry 144, and/or storage device(s) 146. In some examples, computing system 138 may include display device 150. For example, where computing system 138 is embodied in one of user interface device 104, vehicles 111, or traffic controller 114, computing system 138 may include a display device 150 that is integral to the particular device. In some examples, display device 150 may include any display device, such as a liquid crystal display (LCD) or a light emitting diode (LED) display or other type of screen, with which processing circuitry 142 may present information related to predicted collision zones. In some examples, display device 150 may not be included with computing system 138. For example, computing system 138 may be one of data server(s) 132 configured to perform various techniques of this disclosure and transmit to another device, such as one of user interface devices 104, collision zone data for display.

In examples including display device 150, display device 150 may configure collision zone information graphically rendered on a ground navigation application implemented by the aircraft system. In addition, display device 150 may configure position/velocity information for one or more transient surface objects to be graphically rendered on a ground navigation application implemented by the aircraft system. For example, the display device may generate graphical display format data based on the position and velocity information configured compatibly with the graphical outputs of an AMMD application, such that an AMMD application may overlay, superimpose, or otherwise integrate graphical display format data with existing AMMD graphical display outputs. Display device 150 generates outputs including or in the form of the graphical display format data, such that the outputs may be readily configured to be received and graphically rendered by an AMMD application executing on an EFB (e.g., on a tablet computer) in the cockpit of an aircraft in motion on the airport ground surfaces, as further described below. In this way, collision awareness system 140 may provide outputs, including alerts or warnings, that may be immediately available, via display device 150, to inform pilots or other flight crew of a potential hazard of an impending collision, such that the pilot or flight crew can take appropriate action.

In some examples, display device 150, including one or more display processors, may be incorporated in a single processor, electronic system and/or device, or software system with an integrated implementation of collision awareness system 140, in an integrated collision avoidance logic and display processing subsystem. For example, user interface device 104 may include collision awareness system 140 and display device 150 as a single device, such as an EFB.

In some examples, processing circuitry 142 may include fixed function circuitry and/or programmable processing circuitry. Processing circuitry 142 may include any one or more of a microprocessor, a controller, a digital signal processor (DSP), an application specific integrated circuit (ASIC), a field-programmable gate array (FPGA), or equivalent discrete or analog logic circuitry. In some examples, processing circuitry 142 may include multiple components, such as any combination of one or more microprocessors, one or more controllers, one or more DSPs, one or more ASICs, or one or more FPGAs, as well as other discrete or integrated logic circuitry. The functions attributed to processing circuitry 142 herein may be embodied as software, firmware, hardware or any combination thereof.

In some examples, communication circuitry 144 may include a wireless network interface card (WNIC) or other type of communication module. In some examples, communication circuitry 144 may have an Internet Protocol (IP) port coupled to an ethernet connection or to an output port, such that communication circuitry 144 receives outputs from processing circuitry 142. Communication circuitry 144 may be configured to connect to a Wi-Fi™ or other wireless network connection. In some examples, communication circuitry 144 may be separate from collision awareness system 140. For example, collision awareness system 140 may include processing circuitry 142 of computing system 138, whereas communication circuitry may be included as a separate computing system.

In some examples, collision awareness system 140 may include one or more storage device(s) 146. In some examples, storage device(s) 146 may include one or more of datastores 105 and may be similarly configured to store data. For example, storage device(s) 146 may include any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, extensible markup language (XML) files, TeXT (TXT) files, flat files, spreadsheet files, and/or any other widely used or proprietary format for data storage.

In some examples, storage device(s) 146 may include executable instructions that when executed cause processing circuitry 142 to execute various techniques of this disclosure. In addition, storage device(s) 146 may include machine learning (ML) model(s) 148. In some examples, ML model(s) 148 may be included on a separate storage device. For example, ML model(s) 148 may be stored in datastore 105 on data server(s) 132. In such examples, processing circuitry 142 may execute ML model(s) 148 via network connection 130.

In some examples, a trained ML model can be used to process and predict paths, vehicle positions, or collision zones in accordance with certain examples of this disclosure where ML models are considered advantageous (e.g., predictive modeling, inference detection, contextual matching, natural language processing, etc.). Examples of ML models that may be used with aspects of this disclosure include classifiers and non-classification ML models, artificial neural networks ("NNs"), linear regression models, logistic regression models, decision trees, support vector machines ("SVM"), Naïve or a non-Naïve Bayes network, k-nearest neighbors ("KNN") models, k-means models, clustering models, random forest models, or any combination thereof. These models may be trained based on data stored in datastores 105. For example, certain aspects of the disclosure will be described using predicted paths generated from a ML model trains on data from datastores 105, for purposes of illustration only.

A ML system or pattern recognition system may be accessed or incorporated by collision awareness system 140. ML model(s) 148 may incorporate knowledge of the predictable future motions of aircraft, ground vehicles, or other objects based on statistical training of one or more ML model(s) 148 or pattern recognition system based on large training data sets of past motions of aircraft, ground vehicles, and other objects as statistically sampled over a specific airport or a representative collection of airports over time. Such a ML system or pattern recognition system may also incorporate statistical training of observed motions of aircraft, ground vehicles, and other transient object on airport ground surfaces as correlated with a variety of conditions such as traffic levels, weather and visibility conditions, and time of day, for example. One or more initially trained ML model(s) 148 may be further refined with a large corpus of data of motions of aircraft, ground vehicles, and other transient object on airport ground surfaces in comparison with motions predicted by the one or more ML model(s) 148. In addition, collision awareness system 140 of computing system 138 may implement an expert rules system that may incorporate knowledge of general airline gate assignments, specific gate assignments for a particular aircraft or a given flight, and data on assigned taxiing routes between gate areas and runways, that ML model(s) 148 may use to predict routes. For example, processing circuitry 142 may deploy a ML model 148 trained on historical navigation route data from historical vehicle data 106 and trained on general airline gate assignments to predict routes of one of vehicles 111, including worst case and best case scenario routes that may be combined to determine a single predicted route, in accordance with techniques of this disclosure.

In some examples, collision awareness system 140 may be enabled and implemented in existing airport systems, vehicles 111, and/or user interface devices 104, with only minimal hardware or software changes. In addition, in some examples, collision awareness system 140 may be configured to provide credible false alarm mitigation as well as the capability to use a variety of data inputs such as from Automatic Dependent Surveillance-Broadcast (ADS-B)

sources, and provide coverage of any types of vehicles 111 that might potentially collide with a fixed structure or another one of vehicles 111.

Figure 3:
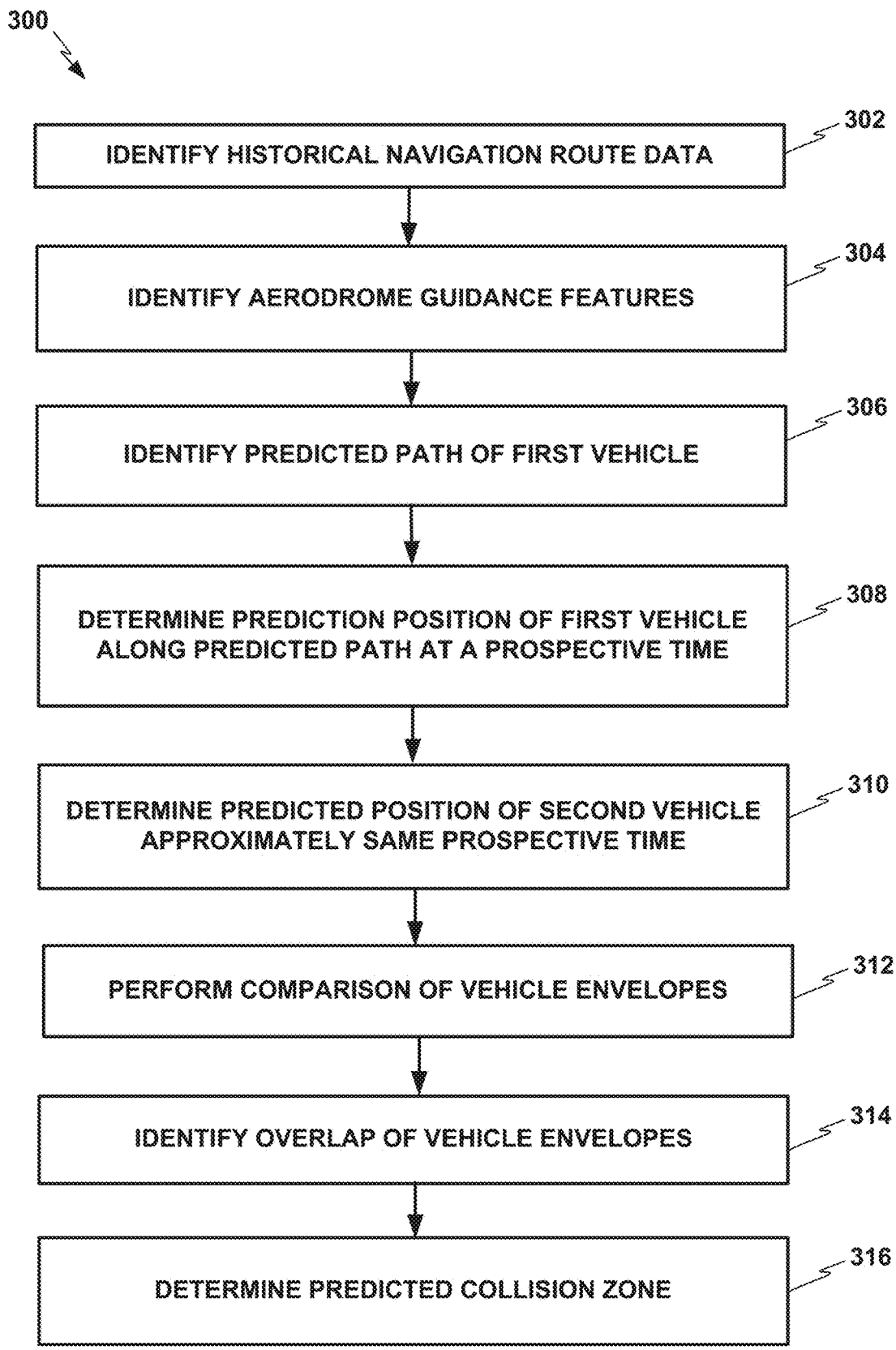
FIG. 3 depicts a flowchart for an example process that a collision awareness system may implement for identifying predicted collision zones, using one or more of the historical navigation route data and/or aerodrome guidance features, in accordance with aspects of this disclosure.

FIG. 3 depicts a flowchart for an example process 300 that collision awareness system 140 may implement for providing collision zone predictions, in accordance with illustrative aspects of this disclosure. Process 300 may include some features that may be optional in some examples. In this example, process 300 includes obtaining (e.g., by processing circuitry 142 of collision awareness system 140) historical navigation route data for one or more vehicles 111 (302). For example, processing circuitry 142 may identify historical navigation route data from historical vehicle data 106. The historical navigation route data may be based at least in part on transponder positional data from vehicles 111. For example, vehicles 111 may transmit, via network 130, navigation route data that may be stored over time as historical navigation route data in historical vehicle datastore 106.

Process 300 further includes identifying (e.g., by processing circuitry 142) a plurality of aerodrome guidance features for a particular aerodrome location (304). For example, processing circuitry 142 may identify aerodrome guidance features for a particular airport from aerodrome guidance data 108. In some examples, the aerodrome guidance features may include guidance marker information, such as guidance signs and guidance lines of an aerodrome location. For example, guidance lines may include coordinates of line markings fixed to an aerodrome surface, such as by being painted to a ground surface).

Process 300 further includes determining (e.g., by processing circuitry 142) a predicted path of a first vehicle (306). In some examples, the predicted path may include a first portion of the predicted path and a second portion of the predicted path. For example, the first portion of the predicted path may include areas of an aerodrome including guidance features, such as on a taxiway or runway, whereas the second portion of the predicted path may include areas of an aerodrome that do not include defined guidance features or areas for which guidance features are unavailable from a database. In such examples, processing circuitry 142 may predict the first portion of the predicted path using the aerodrome guidance features, such as particular guidance marker or guidance signs information, and may predict the second portion of the predicted path using the historical navigation route data from datastore 106. In addition, processing circuitry 142 may predict the first portion of the predicted path using historical navigation route data from datastore 106. For example, processing circuitry 142 may receive information from a particular one of vehicles 111 regarding speed information of vehicle 111 (e.g., the current speed of an aircraft). In such examples, processing circuitry 142 may align the historical path points (e.g., as described with reference to Table 1), speed, and time parameters with surface guidance lines included with aerodrome guidance data 108. The historical navigation route data may indicate how long on average a vehicle takes to travel from one position along a guidance line to another position along the guidance line depending on various factors, such as time of day, vehicle size and weight, traffic flow information, etc. As such, processing circuitry 142 may estimate various ahead positions along the guidance lines based on the historical navigation route data. An illustrative example of processing circuitry 142 using historical navigation route data aligned along (e.g., mapped to) an example aerodrome guidance feature is described below with reference to FIG. 4.

In some examples, the predicted path of the first vehicle is based on a combination of initially predicted paths of the first vehicle, the initially predicted paths including a likelihood of the first vehicle traveling a first initially predicted path and a likelihood of the first vehicle traveling a second initially predicted path. For example, processing circuitry 142 may combine or average a predicted path representing a plurality of best case historical paths and worst case historical path segment to generate the predicted path. The predicted path may be specific to a particular one of vehicles 111 and may include a path connecting points for the particular one of vehicles 111 from a first time (e.g., A1(t1)) to one or more other prospective times (e.g., A1(t1+n), where n represents an integer to be added to t representing a first time).

In such examples, processing circuitry 142 may determine at least two initially predicted paths of the first vehicle. The processing circuitry 142 may also identify a likelihood of the first vehicle traveling any of the initially predicted paths. For example, the likelihood may include an indication of a best case path, meaning that the predicted path is most likely to occur, or an indication of a worst case path, meaning that the predicted path is least likely to occur, or other paths that have likelihoods that fall between best case and worse case paths. In any event, processing circuitry 142 may determine the predicted path of the first vehicle based on a combination of at least two initially predicted paths of the first vehicle. The combination may be based on processing circuitry 142 deploying a ML model able to determine initially predicted paths, combine predicted paths, or both to determine a combined predicted path. In some instances, the combination may be based on the likelihood information, such that more weight is provided paths that are more likely to occur under the circumstances and less weight is provided paths that are less likely to occur under the same circumstances. For example, processing circuitry 142 may determine a weighted average of initially predicted paths or deploy one of ML model(s) 148 to determine a weighted average or other combinations of initially predicted paths.

In some examples, processing circuitry 142 may classify and transfer the predicted path data to datastore 106. Processing circuitry 142 may classify the predicted path based on aircraft type, such that the predicted path may be referenced for future use with similarly situated vehicles 111.

In some examples, processing circuitry 142 may retrieve certain historical data from historical vehicle data 106, to identify a predicted path based on a particular vehicle type and/or current state information of the vehicle. For example, the particular vehicle may be an ownship executing the techniques of this disclosure on an EFB located in the cockpit of the ownship. In such examples, processing circuitry 142 of the EFB may select the best suitable historical data for determining a predicted path. In some examples, the selected best suitable historical data may be dynamic from location-to-location for identifying predicted paths using the ownship parameters. In some examples, ML models may be used for best suitable path selection based on the current data and historical data.

In some examples, processing circuitry 142 may identify clearance information of a traffic controller defining one or more target marks for the first vehicle 111. For example, processing circuitry 142 may query a database for clearance information. The clearance information may include a destination location as one target mark for the first vehicle but may also include multiple target marks along the way to the destination location, such that a vehicle will follow the path along the target mark to reach the destination location.

In some examples, processing circuitry 142 may identify one or more target aiming features from the plurality of aerodrome guidance features based at least in part on the clearance information. In such examples, the one or more target aiming features may be configured to provide guidance through a particular part of an aerodrome toward the one or more target marks. For example, the target aiming features may include aerodrome guidance features that aim or steer a vehicle toward a target, such as by providing arrows, whether virtual or real, that guide vehicle 111 to a target. As such, processing circuitry 142 may identify the first portion of the predicted path using the one or more target aiming features. For example, the first portion may include aerodrome guidance features, such that historical navigation data and aerodrome guidance features may be used in conjunction with one another to determine a predicted path of a vehicle 111 through the first portion of the predicted path. In such examples, processing circuitry 142 may identify the second portion of the predicted path using the clearance information and historical navigation route data, the second portion of the predicted path including a destination location of the first vehicle defined by the clearance information as a target mark of the one or more target marks. The second portion of the predicted path may be through an apron area of an aerodrome that does not include guidance features and thus, historical navigation data may be used to predict the portion of the path. It should be noted that the first portion and the second portion may be switched in some examples, such as when a vehicle is leaving an apron or gate area toward a runway. That is, in some examples, the second portion of the predicted path may include an airport apron region or may include a taxiway comprising surface guidance markings, depending on which direction the vehicle 111 is destined to travel (e.g., toward a gate, toward a runway, toward a hangar bay, or somewhere between, etc.).

Figure 5A:
FIGS. 5A-5C depict a conceptual diagram of a portion of an airport with various aircraft and ground vehicles on airport runways, taxiways, and other airport ground surfaces, and an example collision awareness system predicting the various aircraft and ground vehicle positions on the airport ground surfaces, in accordance with aspects of this disclosure.
Figure 5B:
Figure 5C:
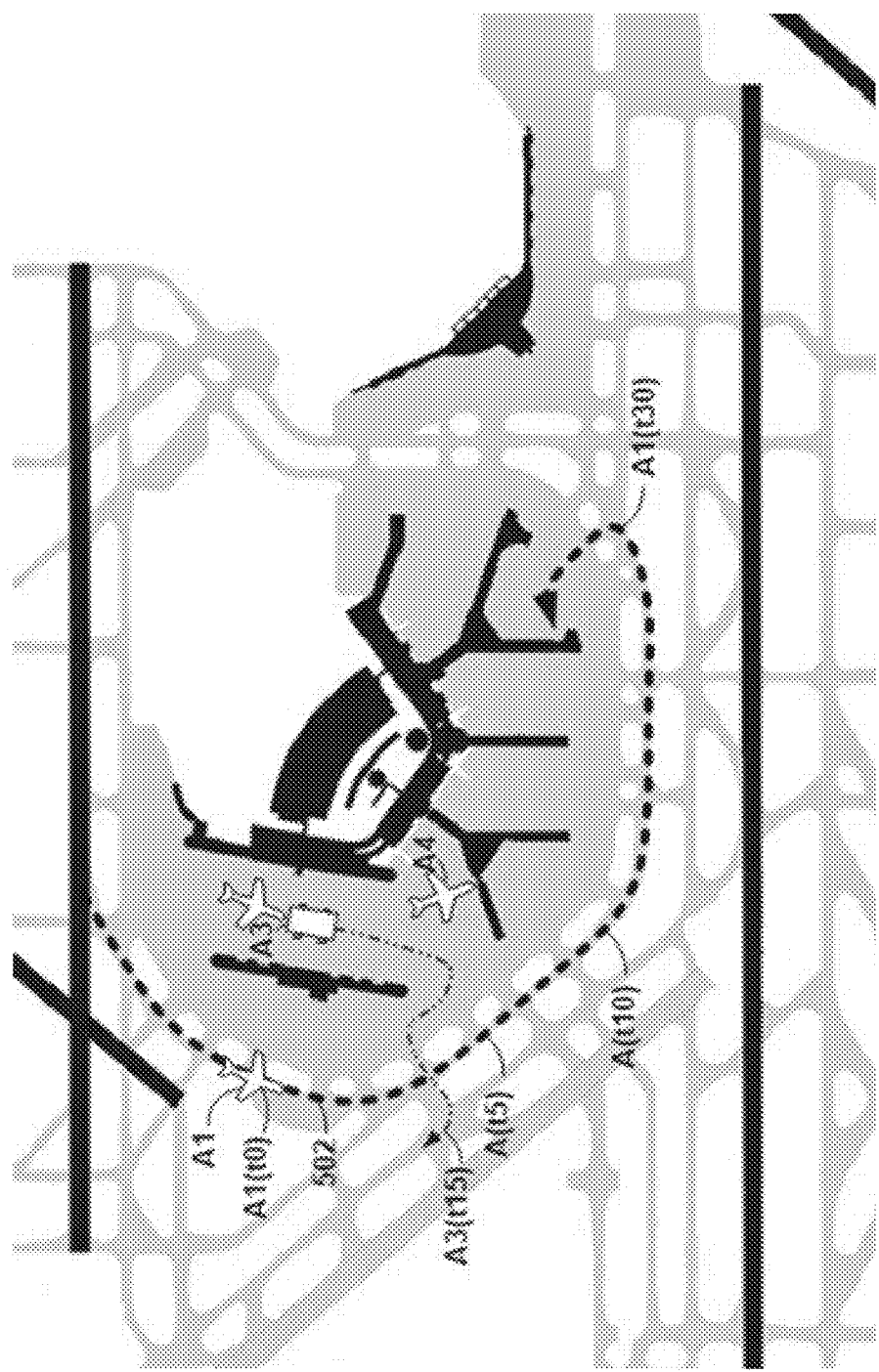

Process 300 further includes determining (e.g., by processing circuitry 142) a predicted position of the first vehicle along the predicted path at a prospective time (308). In some examples, processing circuitry 142 may implement regression algorithms to predict an immediate accurate position using the previous position, speed, and heading information (e.g., A1(t+1) to A1(t+2), where time t is in seconds). In some scenarios, the regression models are used to minimize position deviation error in the historical data. In some examples, data points, such as those shown in Table 1 above, may be used to calculate a cumulative distance of a particular vehicle 111. For example, processing circuitry 142 may calculate the cumulative distance from A1(t1) to A1(t+n). In such examples, processing circuitry 142 may determine all intermediate path points of a path segment from time 't' to 't+n', assuming all intermediate points are locally linear. In some examples, processing circuitry 142 may utilize a function, such as a great circle distance formulae, great circle earth model, or an equivalent projection system formulae to determine position information based on the calculated distance and direction. Processing circuitry 142 may determine the directionality of one of vehicles 111 from the predicted positions along the predicted path. As shown in FIGS. 5A-5C, A1(t1) may be determine based on the function using the current position of the particular vehicle 111 and a cumulative distance according to equations [1] or [2] below.

In such examples, processing circuitry 142 may determine movement information of the first vehicle at a current position. In some examples, the movement information may include speed information of the first vehicle. For example, processing circuitry 142 may receive sensor data or transponder data from one of vehicles 111 indicating a rate at which the particular vehicle 111 is traveling. As such, processing circuitry 142 may identify the predicted position of the first vehicle using the movement information and the historical navigation route data. For example, processing circuitry 142 may determine how much distance the particular vehicle 111 will travel along a predicted path based on the rate at which the particular vehicle 111 is traveling at a current position along the predicted path.

Process 300 further includes determining (e.g., by processing circuitry 142) a predicted position of a second vehicle with respect to approximately the same prospective time (310). For example, processing circuitry 142 may determine a predicted position of the first one of vehicles 111 at a time 15 seconds in the future and thus, may determine a predicted position of another one of vehicles 111 at a time 15 seconds in the future. In essence, processing circuitry 142 may determine a predicted position of each vehicle at any number of prospective times, and processing circuitry 142 will likely find a time or range of times in the future that represent when a vehicle collision is likely to occur (e.g., 14-15 seconds in the future). In some examples, the prospective time corresponding to the predicted position of the second vehicle may be the same as the prospective time corresponding to the predicted position of the first vehicle. For example, the predicted position for both vehicles may correspond to a prospective time of 15 seconds in the future. However, in some instances, the predicted positions may not correspond to the exact same prospective times. For example, due to the size of a vehicle a predicted position at T=14 seconds and predicted position at T=15 seconds may indicate an overlap of vehicle envelopes at either 14 or 15 seconds. In another example, the predicted positions may be determined at different intervals. For example, the predicted position for a first vehicle may be determined on a second-by-second basis, whereas the predicted position for a second vehicle may be determined on a half-second or every other second basis. In such instances, processing circuitry 142 may perform interpolation techniques to predict collision zones at times that are approximately the same (e.g., within a half second or seconds of one another), but may not be exactly the same.

Process 300 further includes performing (e.g., by processing circuitry 142) a comparison of vehicle envelopes for the first vehicle and the second vehicle at the predicted positions (312). For example, processing circuitry 142 may retrieve vehicle envelope data from historical vehicle data 106. The vehicle envelope data may include safe zone envelopes for a single vehicle 111 or multiple vehicles 111, such as in the case of an aircraft 112A being towed by a vehicle tug 113A.

Process 300 further includes identifying (e.g., by processing circuitry 142) an overlap of vehicle envelopes (314). In some instances, processing circuitry 142 may predict a position of one vehicle 112A as turning toward a stationary vehicle 112B. Processing circuitry 142 may determine that through the turn, a safe zone envelope of vehicle 112A will overlap with stationary vehicle 112B and thus, may identify a predicted collision zone. That is, process 300 may be concluded after determining (e.g., by processing circuitry 142) a predicted collision zone of the first vehicle and the second vehicle at the prospective time based at least in part on the overlap of the vehicle envelopes (316). In the above example process, one or both of the vehicles may be powered off, such that avionics are not continuously running so as to provide updates on position of vehicles 111. As such, processing circuitry 142 uses the techniques and data described in process 300 to predict movement of vehicles 111, where an exact location may not be available for the vehicle 111 based on sensor or transponder data.

In some examples, processing circuitry 142 executing process 300 may include processing circuitry 142 of one or more remote data server(s) 132. In such examples, processing circuitry 142 of the one or more remote data server(s) 132 may receive a current position of the first vehicle 111 or an indication of the current position. Processing circuitry 142 may execute all or some of process 300 in order to determine a predicted collision zone. In some examples, processing circuitry 142 of the remote server may transmit the predicted collision zone from the remote server to the first vehicle 111, such as to an EFB or other user interface device 104 that corresponds to vehicle 111.

Figure 4:
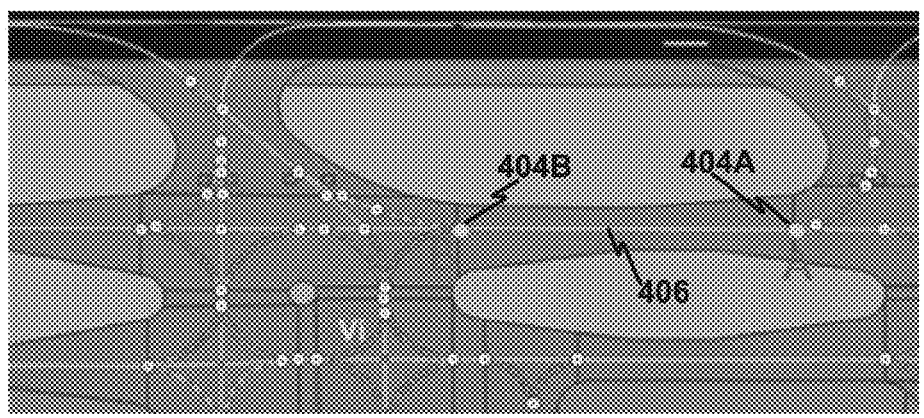
FIG. 4 depicts an example technique that a collision awareness system may implement for aligning historical navigation routes with aerodrome guidance features, in accordance with aspects of this disclosure.
Figure 4:
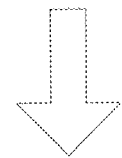
Figure 4:
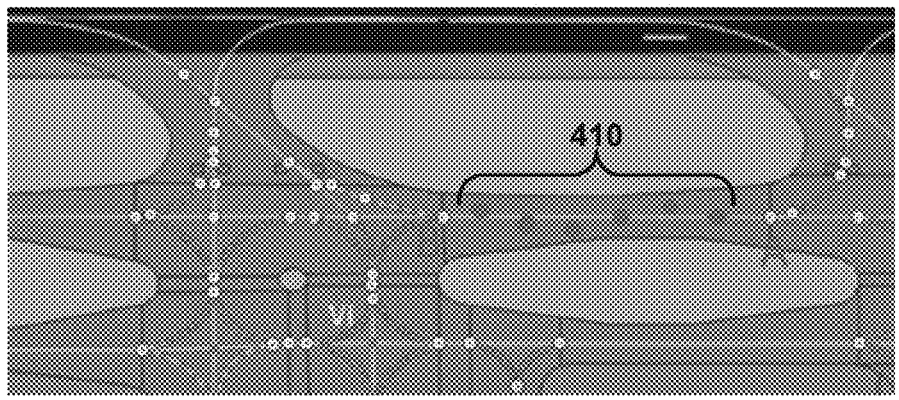
Figure 4:
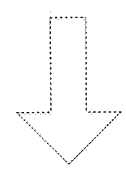
Figure 4:
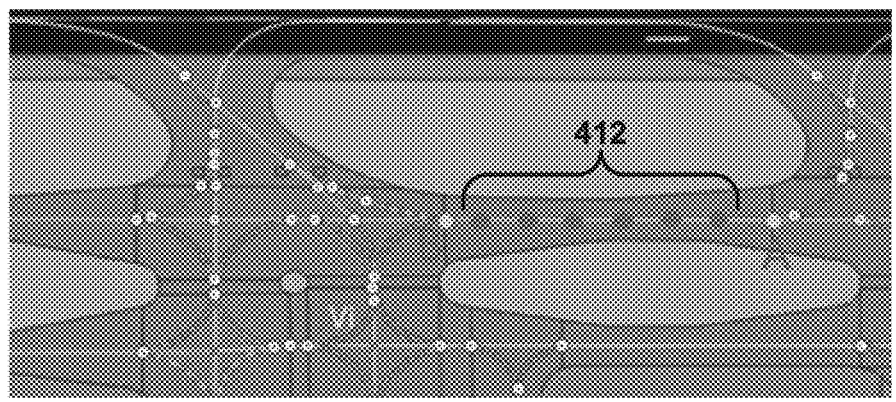

FIG. 4 depicts an example technique that collision awareness system 140 may implement for aligning historical navigation routes with aerodrome guidance features when determining predicted positions of vehicles 111. In some examples, processing circuitry 142 may align historical navigation routes so as to coincide with aerodrome guidance features, such as surface guidance lines. In an example, processing circuitry 142 may predict a path for a first vehicle 111 from an interim source point 404A to an interim destination point 404B (e.g., target marks). The source and destination points 404 may be in an area of an aerodrome having aerodrome guidance features. For example, a surface guidance line 406 may be between source and destination points 404. In some examples, processing circuitry 142 may determine source and destination points 404 based on various predicted points along a predicted path, where the predicted path may be updated as vehicle 111 approaches each predicted point along the predicted path. In some examples, the source and destination points 404 may be based on vehicle clearance data received from traffic controller 114. In some examples, processing circuitry 142 may utilize a combination of clearance data and historical navigation route data to determine points 404A and 404B configured to guide vehicle 111 to an ultimate destination point that may deviate from areas of the aerodrome having surface guidance lines, such as surface guidance line 406.

As shown in FIG. 4, processing circuitry 142 may determine historical navigation route data 410 between points 404A and 404B. Processing circuitry 142 may determine the historical navigation route data 410 from aerodrome guidance data 108. In some examples, historical navigation route data 410 of FIG. 4 may be a combination (e.g., an average) of a plurality of predicted paths, combined into a single predicted path 410 made up of various predicted points along predicted path 410 (e.g., based on weighted averages based on likelihood of each predicted path).

Processing circuitry 142 may align historical data points 410 along a predicted path between points 404A and 404B to determine an aligned predicted path 412. The aligned predicted path 412 may be aligned along surface guidance features, such as surface guidance line 406. Processing circuitry 142 may use aligned predicted path 412 to determine predicted points (e.g., target marks) along the aligned predicted path 412 at prospective times in order to determine collision zones in accordance with various techniques of this disclosure. It will be understood that target marks refer to various points on a surface that a vehicle may target as the vehicle proceeds along a path in order for the vehicle to navigate to a final target mark or final destination. Target marks may change over time, e.g., as processing circuitry 142 updates the predicted path. Processing circuitry 142 may further update predicted positions along the updated predicted paths over time, e.g., based on changes in vehicle speed.

FIGS. 5A-5C depict conceptual diagrams of a portion of an aerodrome 500 with various aircraft and ground vehicles on airport runways, taxiways, and other aerodrome ground surfaces. The various aircraft and ground vehicles shown in FIGS. 5A-5C include aircraft 112 and ground vehicles 113 (designated in FIGS. 5A-5C as A1-A4 for simplicity). As discussed above with respect to FIG. 1, collision awareness system 140 may be configured to determine predicted paths and positions of vehicles 111, actual positions and velocities of the vehicles 111, determine alert envelopes, and predict collision zones of vehicles 111. Collision awareness system 140 may then output the position and velocity information for the one or more transient surface objects and indications of potential collision zones to network 130, such that these outputs from collision awareness system 140 may be received by an EFB on at least one of the vehicles 111 among the transient surface objects on the ground surfaces of aerodrome 500.

FIG. 5A illustrates a simplified example of two vehicles A1 and A2, which may be aircraft of vehicles 112A-112N, but will be referred to as vehicles A1 and A2 for simplicity in illustrative a time progression using tX indicators. In the examples of FIGS. 5A-5C, t0–tX indicate time in seconds. For example, t0 indicates an initial starting point of time 0, whereas t5 indicates a predicted position after 5 second has passed. In FIG. 5A, vehicle A1 has received clearance information to park at a particular destination location. Processing circuitry 142 may predict a path 502 of vehicle A1 in accordance with various techniques of this disclosure. For example, processing circuitry 142 may deploy a ML model to determine a combined predicted path determined from best case and worst case path predictions as informed by historical navigation route data at aerodrome 500 or other aerodromes. Processing circuitry 142 may determine a predicted position of vehicle A1 along predicted path 502 at any time interval. While the examples of FIGS. 5A-5C show 5 second intervals, the techniques of this disclosure are not so limited, and any time interval may be used including a variable time interval. In the example of FIG. 5A, four predicted positions are predicted for vehicle A1 at 5 seconds, 10 seconds, 15 seconds, and 30 seconds. Processing circuitry 142 may determine the predicted positions using historical navigation route data, aligned with aerodrome guidance features where available, or in some examples, may use historical navigation route data without aerodrome guidance features where the aerodrome guidance features are unavailable, such as in areas of aerodrome 500 where guidance lines are nonexistent (e.g., apron area, a gate area, etc.).

Processing circuitry 142 may further predict a predicted path and position of vehicle A2. In some examples, vehicle A2 may be an aircraft that received clearance information from traffic controller 114 indicating one or more target marks for vehicle A2. For example, processing circuitry 142 may identify a predicted path of the second vehicle using a predicted current position of the second vehicle. In such examples, processing circuitry 142 may predict the current position of the second vehicle based on the historical navigation route data. For example, processing circuitry 142 may deploy a ML model trained on historical navigation route data, aerodrome guidance features, and/or clearance information to determine the predicted path. The ML model may identify patterns in the historical navigation route data, aerodrome guidance features, and/or clearance information that indicate a predicted path that a vehicle is likely to take toward a target mark or target destination location.

As such, processing circuitry 142 may predict positions of vehicle A2 along predicted route 503, the predicted positions including at least one time that coincides with a predicted position time with respect to vehicle A1 (e.g., t10, t15, t30). In some examples, processing circuitry 142 may determine the predicted position of the second vehicle using the predicted current position of the second vehicle and one or more of: the historical navigation route data, the plurality of aerodrome guidance features, or clearance information for the second vehicle. In the example of FIG. 5A, processing circuitry 142 may determine that an overlap of safe zone envelopes for both vehicles A1 and A2 will occur at a prospective time of 15 seconds in the future, unless certain changes are made to the system, such as a slowing or speeding up of one or the other vehicle.

Processing circuitry 142 may perform another prediction at various intervals using new information as the information becomes available, such as velocity or acceleration data of vehicles A1 and A2. In any event, processing circuitry 142 may identify the predicted collision zone as the area of overlap 508. While safe zone envelopes are shown as a circle in FIGS. 5A-5C, safe zone envelopes may be any shape and may be specific to the shape of the particular vehicle 111. For example, where vehicle 112A (e.g., A1) is a particular aircraft having a particular size and shape, the safe zone envelope for vehicle 112A may resemble the size and shape of vehicle 112A, such that the detected overlap will indicate where on the vehicle the overlap is predicted to occur. In the example of FIG. 5A, processing circuitry 142 may determine the overlap of envelopes 508 indicates that the nose of vehicle A2 is predicted to collide with the left wing of vehicle A1 at a prospective time of t15.

If there are any collision zones ahead to the ownship, processing circuitry 142 generates a visual or text notification for display on user interface device 104. As an example, the below equation [1] is used for computing the cumulative distance along the track from time 't' to time 't+n' where 't' is in seconds and 'n' is a positive integer value.

$$\text{distance} = u*t + \frac{1}{2}*a*t^2 \qquad [1]$$

where 'u' refers to the velocity or speed, 't' refers to the change in time and 'a' refers to the acceleration (change in speed).

As shown in FIG. 3, historical performance/track data has speed and velocity information. The acceleration is calculated with speed difference at each position. If the speed is constant (i.e., 'a'=0), then equation (1) (above) reduces to equation [2] (below):

$$\text{distance} = u*t \qquad [2]$$

In the example of FIG. 5B, vehicle A3 represents an aircraft tug vehicle pulling an aircraft. Processing circuitry 142 may predict a path of vehicle A3 and determine that vehicles A2 and A3 are not predicted to collide because at 5 seconds, vehicle A1 is predicted to be beyond the intersection point of the predicted path of vehicles A1 and A3. In the example of FIG. 5B, processing circuitry 142 may predict a first portion of a predicted path of vehicle A3 using historical navigation route data, such as in the apron area of aerodrome 500. Processing circuitry 142 may predict a second portion of predicted path of vehicle A3 using historical navigation route data and aerodrome guidance features, such as in an area of aerodrome 500 that includes guidance features that vehicles 111 are expected to follow to reach a predefined destination.

The example of FIG. 5C is similar except that a vehicle A4 is predicted to be located near the path of A3. In the example of FIG. 5C, vehicle A4 may be a parked vehicle that has the avionics system turned off. As such, processing circuitry 142 may use historical navigation route data to determine the predicted position of vehicle A4 and determine a predicted path of vehicle A4. In this example, vehicle A4 does not have a predicted path in the foreseeable future based on clearance information, historical navigation route data, and/or other aircraft information available to processing circuitry 142, such as flight times relating to vehicle A4, etc. In such examples, processing circuitry 142 may determine whether vehicle A3 will have enough clearance to follow along a predicted path without clipping parked vehicle A4. In some examples, processing circuitry 142 may determine a predicted collision zone between vehicles A3 and A4 and provide a notification for display on one of user interface devices 104.

Figure 6:
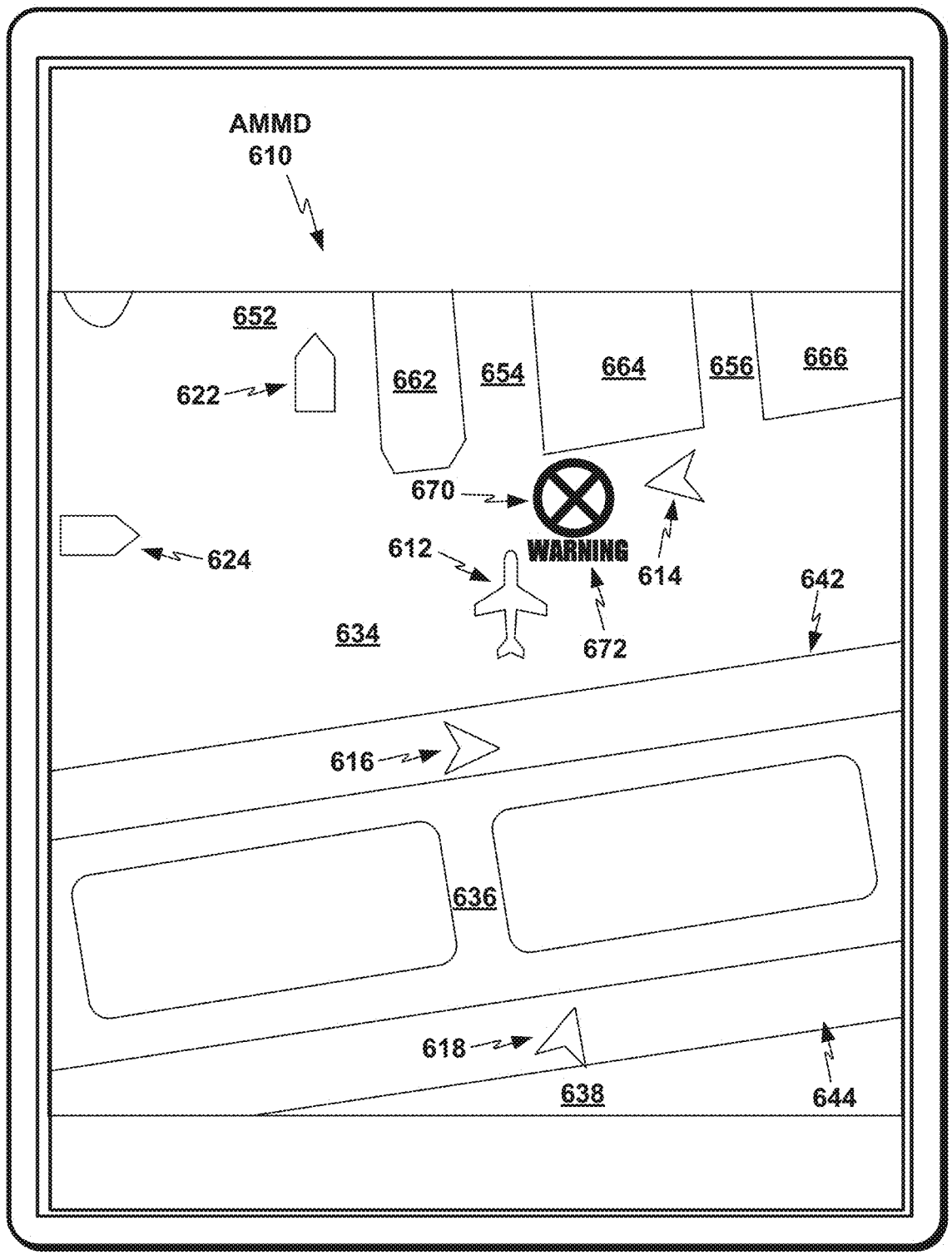
FIG. 6 is a diagram of an example graphical output display of an airport ground surface map that may be implemented by a two-dimensional airport moving map display (2D AMMD) application that may be implemented on an electronic flight bag (EFB), e.g., on a tablet computer of a flight crew member in the cockpit of a particular aircraft on a ground surface of the airport, in accordance with aspects of this disclosure.

FIG. 6 is a diagram of an example graphical output display 610 of an airport ground surface map that may be implemented by a two-dimensional airport moving map display (2D AMMD) application that may be implemented on an EFB. For example, a 2D AMMD application may be implemented on one of user interface devices 104, such as an EFB tablet computer in the cockpit of a particular aircraft (e.g., aircraft 112 in FIG. 1), e.g., while the aircraft is on the ground and, for example, taxiing or otherwise moving. In other examples, the 2D AMMD application may be implemented on another device, other than or in addition to, one of user interface device(s) 104. In other examples, a graphical output display analogous to graphical output display 610 may be implemented by a three-dimensional AMMD application that may be implemented on an EFB or other application package executing on a tablet computer or other type of computing and display device.

The AMMD application graphical output display 610 (or "AMMD 610") includes representations (e.g., graphical icons) of transient surface vehicles that may be received and/or decoded by a transient surface object overlay module of an AMMD application executing on user interface device 104 that provides AMMD 610. AMMD 610 thus includes a graphical icon of an ownship 612 (e.g., that may correspond to vehicles 111 in FIG. 1 and one of vehicles A1-A4 in FIGS. 5A-5C, in the cockpit of which user interface device 104 is being used); graphical icons of other moving vehicles 614, 616, and 618 (e.g., corresponding to other vehicles 111); and graphical icons of ground vehicles 622, 624 (e.g., corresponding to ground vehicles 113), in the display example shown in FIG. 6.

AMMD 610 also includes representations of aerodrome guidance features, such as surface guidance markers 642 and 644. AMMD 610 may also include representations of taxiways 634, 636, and 638, and apron areas 652, 654, and 656 near airport terminal building portions 662, 664, and 666. AMMD 610 may include indications of potential collision zones provided by collision awareness system 140, such as warning graphic 670 and textual warning notice 672 between ownship icon 612 and aircraft icon 614, based on a predicted collision zone determined and transmitted by collision awareness system 140. In one example, ownship 612 may have a predicted route leading from between surface guidance markers 642 to apron area 656. In such instances, a first portion of the predicted route may include portions of taxiway 634 and a second portion of the predicted route may include portions of apron area 656. In any event, the first portion may correspond to areas of the particular aerodrome location that include aerodrome guidance features, such as surface guidance markers, whereas the second portion may correspond to areas of the particular aerodrome location that do not include aerodrome guidance features, such as apron areas.

In some examples, vehicle 614 and/or vehicle 612 may not be physically present at the position shown on AMMD 610. That is, AMMD 610 may display predicted positions of vehicle 614 and/or vehicle 612 at or near predicted collision zone 670. AMMD 610 may also display predicted routes along with current positions and one or more predicted positions over time. In another example, AMMD 610 may display one or more predicted positions of second vehicle 614, such that a user may view the predicted route and predicted positions contributing to the predicted collision zone of ownship 612 and second vehicle 614. The user may toggle on and off various aspects of displayed information, such as toggling on or off predicted positions of. In one example, predicted positions and/or predicted routes may be displayed as holograms or otherwise, faint depictions, of vehicle movement or stationary location of a vehicle so as to indicate to a user that the position or route is not an actual route, but instead represents a predicted route that is subject to change over time based on predictions from collision awareness system 140.

In this example, collision awareness system 140 may connect to an aircraft system of a particular aircraft 612 (e.g., the EFB application running on user interface device 104) over the extended range wireless network (via a wireless router, such as wireless router 710 of FIG. 7), where the particular aircraft may be among the transient surface objects that collision awareness system 140 is monitoring. In some examples, collision awareness system 140 may establish a secure wireless communication channel over the extended range wireless network with the EFB application running on user interface device 104, or with another aircraft system on the particular aircraft, and then transmit its information, including the position and velocity information for the one or more transient surface objects, over the secure wireless communication channel.

In various examples, the EFB application executing on user interface device 104 may thus receive all of the information transmitted by collision awareness system 140, and receive all of the benefit of collision awareness system 140, simply with a software upgrade to an EFB application that implements examples of this disclosure. Thus, in various examples, a pilot or flight crew may gain the benefits of this disclosure without requiring any new hardware (since an EFB application of this disclosure may execute on an EFB tablet computer or other EFB that a flight crew already has), and without requiring any hardware or software change to the installed equipment of the aircraft itself, and thus without the need to go through a certification process of any new installed aircraft systems. A pilot, flight crew, or aircraft operator may also enjoy the benefits of an implementation of this disclosure without the need to rely on new hardware or software from an original equipment manufacturer (OEM) of installed hardware or software systems installed in the aircraft.

Figure 7:
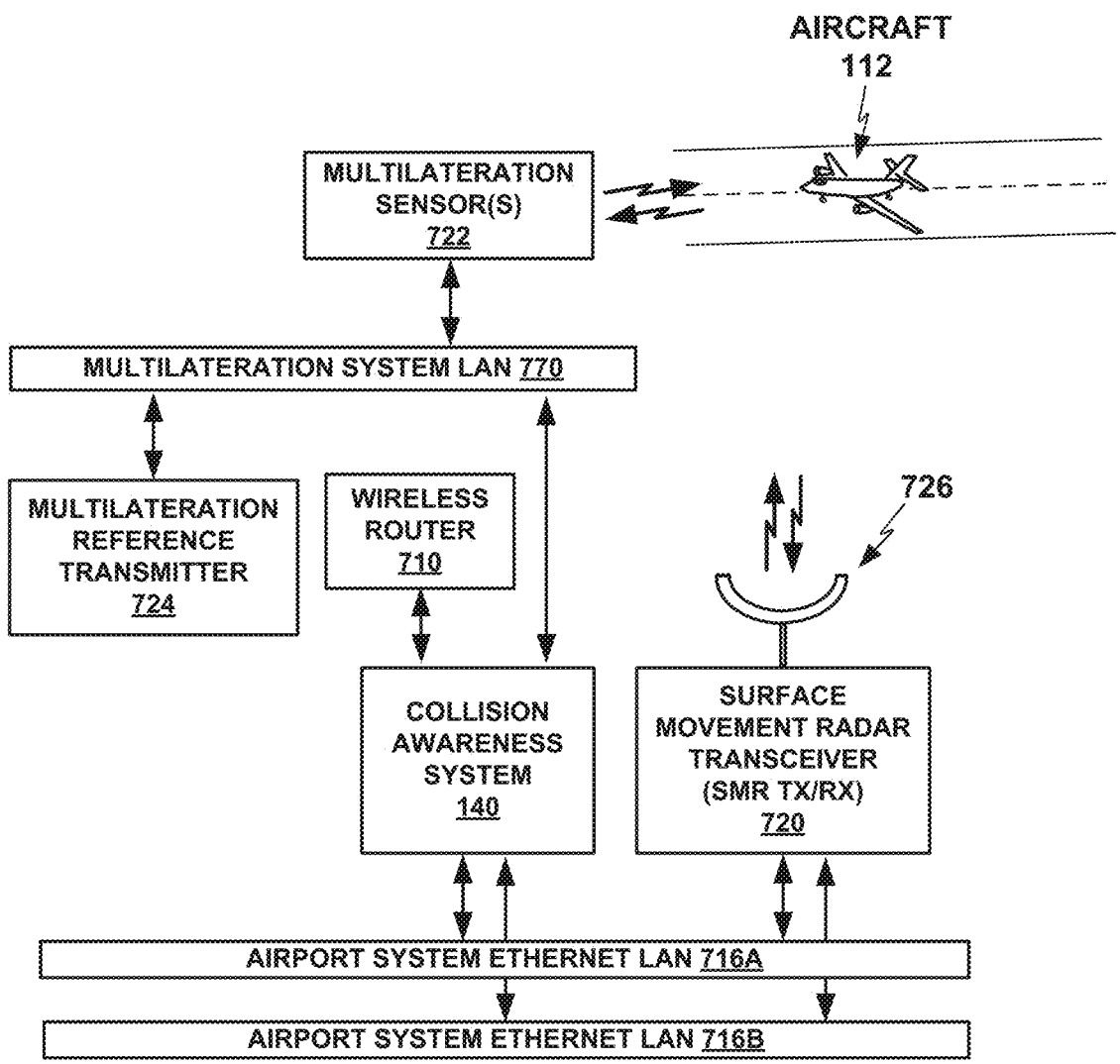
FIG. 7 is a conceptual block diagram depicting an example aerodrome network system with example ground surface sensors, in accordance with aspects of this disclosure.

FIG. 7 is a conceptual block diagram depicting an example aerodrome network system with example ground surface sensors that may be used in conjunction with collision awareness system 140. In the example shown in FIG. 7, the example aerodrome network system includes collision awareness system 140 connected to a wireless router 710 via communication circuitry 144. Collision awareness system 140 may be communicatively connected to a number of airport ground surface sensors of various types, including a surface movement radar (SMR) transceiver 720, multilateration sensor(s) 722, multilateration reference transmitter 724, and/or to additional types of airport ground surface sensors via multilateration system LAN 770 or redundant airport system ethernet local area networks (LANs) 716A and 716B ("airport system LANs 716"). Multilateration sensor(s) 722 may gather data on the movement of surface vehicles 111 and provide the data to collision awareness system 140 via network 130 (e.g., airport system ethernet LAN 716, etc.), such that collision awareness system 140 may use such data to confirm various predictions based on non-sensor data.

In some examples, processing circuitry 142 may receive ground surface sensor data for a first vehicle and/or a second one of vehicles 111. Processing circuitry 142 may receive ground surface sensor data collected as described in various techniques of U.S. Patent Publication No. 2016/0196754, by Lawrence J. Surace, filed Jan. 6, 2015, the entire content of which is hereby incorporated by reference in its entirety. For example, SMR transceiver 720 is connected to at least one SMR antenna 726. SMR transceiver 720 and SMR antenna 726 may be configured to detect, monitor and gather data from various airport ground surfaces and detect transient surface objects on the airport ground surfaces, including aircraft, ground vehicles, and any other moving or impermanent objects on the ground surfaces (or "transient surface objects"). In such examples, processing circuitry 142 may use data from one or more SMR transceivers 720, multilateration sensors 722, or other airport ground surface sensors, and combine the data from these multiple airport ground surface sensors to generate position and velocity information for the one or more transient surface objects on the airport ground surfaces. Processing circuitry 142 may use the position and velocity information for the one or more transient surface objects on the airport ground surfaces to determine predicted positions along predicted paths by extrapolating a position using the current position, velocity information and predicted changes in velocity or position as informed by historical navigation route data.

In any event, processing circuitry 142 may then determine a current position of the first vehicle and/or the second vehicle from the ground surface sensor data. In some instances, processing circuitry 142 may determine the current position for one vehicle, whereas the other vehicle may be parked and out of range of the ground surface sensors. In any event, processing circuitry 142 may predict a current position of the other vehicle using historical navigation route data. In such examples, processing circuitry, may identify both a predicted position of the first vehicle and a predicted position of the second vehicle using the current position of the first and second vehicles 111.

Multilateration sensors 722 may be configured to detect, monitor and gather data from various airport ground surfaces and to detect transient surface objects on the airport ground surfaces, in ways that may complement the detection by SMR transceiver 720. Example multilateration sensor data collection techniques are described in U.S. Patent Publication No. 2016/0196754. For example, multilateration sensors 722 may be implemented as omnidirectional antenna sensors stationed at various remote locations around the airport.

In some examples, collision awareness system 140 may be connected to any one or more sensors of a wide variety of other types of sensors configured to detect transient surface objects on the airport ground surfaces. For example, processing circuitry 142 of collision awareness system 140 may be communicatively connected to and configured to receive data from one or more microwave sensors, optical imaging sensors, ultrasonic sensors, lidar transceivers, infrared sensors, and/or magnetic sensors. In some examples, collision awareness system 140 may incorporate features and/or components of an airport ground surface monitoring system, such as Advanced Surface Movement Guidance and Control System (A-SMGCS) or Airport Surface Detection Equipment-Model X (ASDE-X) System. For example, collision awareness system 140 may incorporate one or more of the SMR transceiver 720 and SMR antenna 726, multilateration sensors 722, and/or other airport ground surface sensors.

In some examples, collision awareness system 140 may incorporate or integrate signals or sensor input from a combination of surface movement radar, multilateration sensors, and satellites. One or more of the types of airport ground surface sensors may be configured to generate signals indicative of positions of transient ground objects to within a selected accuracy, such as five meters, for example, enabling processing circuitry 142 to generate position and velocity information for the transient ground objects of a similar level of accuracy. Processing circuitry 142 may also be at least at times (at all times or at only certain times) communicatively connected to sensors positioned outside the vicinity of the airport, such as imaging sensors hosted on satellites, airships, or drones with imaging and communication capability.

Processing circuitry 142 may be configured to use data from SMR transceiver 720 and/or multilateration sensors 722 and multilateration reference transmitter 724 to evaluate or determine positions and velocities of transient surface objects on the airport ground surfaces, and to generate position and velocity information for one or more transient surface objects on the airport ground surfaces based at least in part on data from the SMR transceiver 720 and/or from the multilateration sensors 722, and/or from one or more other airport ground surface sensors. In some examples, processing circuitry 142 may generate positions and velocities at one or more times of one or more airport ground vehicles or other ground support equipment, such as refueler trucks, pushback tugs, airport busses, container loaders, belt loaders, baggage carts, catering vehicles, emergency vehicles, snow removal vehicles, or ground maintenance equipment, for example.

Multilateration sensors 722 may in some examples perform active cooperative interrogation of moving aircraft on the airport ground surfaces. For example, multilateration sensors 722 may transmit interrogation signals via a 1030/1090 megahertz (MHz) Traffic Collision Avoidance System (TCAS) surveillance band. In some examples, multilateration sensors 722 may include Automatic Dependent Surveillance-Broadcast (ADS-B) transceivers (e.g., Mode S ADS-B transceivers) configured to receive ADS-B messages from aircraft on the airport ground surface. Various aircraft in motion on the airport ground surfaces (at least, aircraft that have their ADS-B systems active while on the ground) may automatically transmit ADS-B messages that may be received by multilateration sensors 722. Multilateration sensors 722 using ADS-B may receive the ADS-B messages and communicate the ADS-B messages, potentially with additional data such as time of receipt, to processing circuitry 142, thus facilitating processing circuitry 142 determining and generating position and velocity information for the responding aircraft.

In some examples, processing circuitry 142 of collision awareness system 140 may be configured to output the position and velocity information generated for transient surface objects to communication circuitry 144 and thus to extended range wireless router 710 for transmission over a wireless local area network. For example, processing circuitry 142 of collision awareness system 140 may output position and velocity information for one or more transient ground surface objects at a selected ethernet connection or output port to an IP address, where the selected ethernet connection or output port is connected to communication circuitry 144, for example, via a WNIC.

The extended range wireless network established by wireless router 710 (and potentially additional wireless routers in communicative connection with communication circuitry 144) may extend its range across the airport, and include all of the taxiways, runways, gate areas, apron areas, hangar bays, and other trafficways in its range. The extended range wireless network provided by wireless router 710 may thus include all of the aircraft on the airport ground surfaces within range, and may potentially provide wireless connectivity in the cockpits of all of the aircraft, including to EFBs of the pilots or flight crew of the various aircraft. In some examples, extended range wireless router 710 may be incorporated together with collision awareness system 140 in a single unit or component.

Thus, in various examples, in collision awareness system 140 including processing circuitry 142 and communication circuitry 144, processing circuitry 142 is configured to receive data from one or more airport ground surface sensors (e.g., one or both of SMR transceiver 720 and multilateration sensors 722) configured to detect transient surface objects on an airport ground surface. Processing circuitry 142 of collision awareness system 140 may be further configured to generate position and velocity information for one or more transient surface objects on the airport ground surface based at least in part on the data from the one or more airport ground surface sensors. Communication circuitry 144 of collision awareness system 140 may be configured to receive the position and velocity information for the one or more transient surface objects from processing circuitry 142 and to output the position and velocity information for the one or more transient surface objects to wireless router 710 for transmission over a wireless local area network.

Any of a wide variety of processing devices, such as collision awareness system 140, other components that interface with collision awareness system 140 and/or implement one or more techniques of collision awareness system 140, or other central processing units, ASICs, graphical processing units, computing devices, or processing devices of any other type may perform process 300 or portions or aspects thereof. Collision awareness system 140 and/or other components that interface with collision awareness system 140 and/or implement one or more techniques of collision awareness system 140 as disclosed above may be implemented in any of a variety of types of circuit elements. For example, processors of collision awareness system 140 or other components that interface with collision awareness system 140 and/or implement one or more techniques of collision awareness system 140 may be implemented as one or more ASICs, as a magnetic nonvolatile random-access memory (RAM) or other types of memory, a mixed-signal integrated circuit, a central processing unit (CPU), a field programmable gate array (FPGA), a microcontroller, a programmable logic controller (PLC), a system on a chip (SoC), a subsection of any of the above, an interconnected or distributed combination of any of the above, or any other type of component or one or more components capable of being configured to predict collision zones at a prospective time using guidance features of an aerodrome, historical data, and/or clearance information, and perform other functions in accordance with any of the examples disclosed herein.

Functions executed by electronics associated with the devices systems described herein may be implemented, at least in part, by hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in electronics included in components of system 140 or other systems described herein. The terms "processor," "processing device," or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. For example, while collision awareness system 140 is shown as a separate system in FIG. 1, collision awareness system 140 may execute on one or more of data server(s) 132, vehicles 111, traffic controller 114, user interface devices 104, data stores 105, or any combination thereof. In one example, collision awareness system 140 may be implemented across multiple devices, such as data server(s) 132 and vehicles 111 simultaneously.

When implemented in software, functionality ascribed to the devices and systems described herein may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure. The computer-readable medium may be non-transitory.

Various aspects of the disclosure have been described. These and other aspects are within the scope of the following claims.

What is claimed is:

1. A method of predicting vehicle collision zones, the method comprising:
    enabling, by processing circuitry in response to a user input, a ground collision awareness system;
    obtaining, by the processing circuitry of the ground collision awareness system, historical navigation route data for one or more reference vehicles, the historical navigation route data being based on transponder positional data;
    identifying, by the processing circuitry, a plurality of aerodrome guidance features for a particular aerodrome location, the aerodrome guidance features including guidance marker information fixed to a surface of the particular aerodrome location;
    determining, by the processing circuitry, a predicted path of a first vehicle, the predicted path comprising a first portion and a second portion, the first portion of the predicted path being predicted using the guidance marker information, and the second portion of the predicted path being predicted using the historical navigation route data;
    determining, by the processing circuitry deploying a machine learning model trained on the historical navigation route data, a predicted position of the first vehicle along the predicted path at a prospective time;
    determining, by the processing circuitry deploying the machine learning model trained on the historical navigation route data, a predicted position of a second vehicle with respect to approximately the same prospective time;
    performing, by the processing circuitry, a comparison of a first vehicle envelope for the first vehicle and a second vehicle envelope for the second vehicle at the predicted positions;
    identifying, by the processing circuitry, an overlap of the first vehicle envelope and the second vehicle envelope;
    determining, by the processing circuitry, a predicted collision zone of the first vehicle and the second vehicle at the prospective time based at least in part on the overlap of the first vehicle envelope and the second vehicle envelope, and the aerodrome guidance features; and
    outputting, to a display device, an alert that includes an indication of the predicted collision zone.

2. The method of claim 1, wherein determining the predicted path further comprises:
    determining a first initially predicted path of the first vehicle using the guidance marker information and the historical navigation route data;
    identifying a first likelihood of the first vehicle traveling the first initially predicted path;
    determining a second initially predicted path of the first vehicle using the guidance marker information and the historical navigation route data;
    identifying a second likelihood of the first vehicle traveling the second initially predicted path; and
    determining the predicted path of the first vehicle based on a combination of the first initially predicted path of the first vehicle and the second initially predicted path of the first vehicle, the combination being based at least in part on the first likelihood and the second likelihood.

3. The method of claim 1, wherein determining the predicted path further comprises:
    identifying, by the processing circuitry, clearance information of a traffic controller defining one or more target marks for the first vehicle;
    identifying, by the processing circuitry, one or more target aiming features from the plurality of aerodrome guidance features based at least in part on the clearance information, the one or more target aiming features configured to provide guidance through a particular part of the particular aerodrome location toward the one or more target marks;
    identifying, by the processing circuitry, the first portion of the predicted path using the one or more target aiming features; and identifying, by the processing circuitry, the second portion of the predicted path using the clearance information and historical navigation route data, the second portion of the predicted path including a destination location of the first vehicle defined by the clearance information as a target mark of the one or more target marks.

4. The method of claim 1, further comprising:
receiving ground surface sensor data for the first vehicle or the second vehicle;
determining a current position of the first vehicle or the second vehicle from the ground surface sensor data; and
identifying the predicted position of the first vehicle or the predicted position of the second vehicle using the current position of the first vehicle or the second vehicle.

5. The method of claim 1, further comprising:
determining movement information of the first vehicle at a current position, the movement information including speed information of the first vehicle; and
identifying the predicted position of the first vehicle using the movement information and the historical navigation route data.

6. The method of claim 1, wherein the processing circuitry corresponds to a remote server, wherein the method further comprises:
receiving, by the processing circuitry of the remote server, a current position of the first vehicle; and
transmitting, by the processing circuitry, the predicted collision zone from the remote server to the first vehicle.

7. The method of claim 1, further comprising:
identifying, by the processing circuitry, a predicted path of the second vehicle using a predicted current position of the second vehicle, the predicted current position of the second vehicle based on the historical navigation route data; and
determining, by the processing circuitry, the predicted position of the second vehicle using the predicted current position of the second vehicle and one or more of: the historical navigation route data, the plurality of aerodrome guidance features, or clearance information for the second vehicle.

8. The method of claim 1, further comprising:
transmitting the predicted collision zone to a device corresponding to at least one of: the first vehicle, the second vehicle, a third vehicle configured to transport the first or second vehicles, or a remote server.

9. A ground collision awareness system comprising:
a memory configured to store:
historical navigation route data for one or more reference vehicles, wherein the historical navigation route data are based on transponder positional data, and
a plurality of aerodrome guidance features for one or more aerodrome locations, wherein the aerodrome guidance features include guidance marker information fixed to a surface of a particular aerodrome location; and
processing circuitry in communication with the memory, wherein the processing circuitry is configured to:
enable, in response to a user input, the ground collision awareness system;
determine a predicted path of a first vehicle, the predicted path comprising a first portion and a second portion, the first portion of the predicted path being predicted using the guidance marker information, and the second portion of the predicted path being predicted using the historical navigation route data;
determine, based on a machine learning model and trained on the historical navigation route data, a predicted position of the first vehicle along the predicted path at a prospective time;
determine, based on a machine learning model and trained on the historical navigation route data, a predicted position of a second vehicle with respect to approximately the same prospective time;
perform a comparison of a first vehicle envelope for the first vehicle and a second vehicle envelope for the second vehicle at the predicted positions;
identify an overlap of the first vehicle envelope and the second vehicle envelope; and
determine a predicted collision zone of the first vehicle and the second vehicle at the prospective time based at least in part on the overlap of the first vehicle envelope and the second vehicle envelope and the aerodrome guidance features; and
output, to a display device, an alert that includes an indication of the predicted collision zone.

10. The system of claim 9, wherein to determine the predicted path of the first vehicle, the processing circuitry is further configured to:
determine a first initially predicted path of the first vehicle using the guidance marker information and the historical navigation route data;
identify a first likelihood of the first vehicle traveling the first initially predicted path;
determine a second initially predicted path of the first vehicle using the guidance marker information and the historical navigation route data;
identify a second likelihood of the first vehicle traveling the second initially predicted path; and
determine the predicted path of the first vehicle based on a combination of the first initially predicted path of the first vehicle and the second initially predicted path of the first vehicle, the combination being based at least in part on the first likelihood and the second likelihood.

11. The system of claim 9, wherein the processing circuitry is further configured to:
identify clearance information of a traffic controller defining one or more target marks for the first vehicle;
identify one or more target aiming features from the plurality of aerodrome guidance features based at least in part on the clearance information, the one or more target aiming features configured to provide guidance through a particular part of a particular aerodrome location toward the one or more target marks;
identify the first portion of the predicted path using the one or more target aiming features; and
identify the second portion of the predicted path using the clearance information and historical navigation route data, the second portion of the predicted path including a destination location of the first vehicle defined by the clearance information as a target mark of the one or more target marks.

12. The system of claim 9, wherein the processing circuitry is further configured to:
receive ground surface sensor data for the first vehicle or the second vehicle;
determine a current position of the first vehicle or the second vehicle from the ground surface sensor data; and identify the predicted position of the first vehicle or the predicted position of the second vehicle using the current position of the first vehicle or the second vehicle.

13. The system of claim 9, wherein the processing circuitry is further configured to:
   determine movement information of the first vehicle at a current position, the movement information including speed information of the first vehicle; and
   identify the predicted position of the first vehicle using the movement information and the historical navigation route data.

14. The system of claim 9, wherein the processing circuitry is further configured to:
   receive a current position of the first vehicle; and
   transmit the predicted collision zone from a remote server to the first vehicle.

15. The system of claim 14, wherein the processing circuitry is further configured to:
   transmit the predicted collision zone from the remote server to the first vehicle using a wireless network.

16. The system of claim 9, wherein the processing circuitry is further configured to:
   identify a predicted path of the second vehicle using a predicted current position of the second vehicle, the predicted current position of the second vehicle based on the historical navigation route data; and
   determine the predicted position of the second vehicle using the predicted current position of the second vehicle and one or more of: the historical navigation route data, the plurality of aerodrome guidance features, or clearance information for the second vehicle.

17. The system of claim 9, wherein the processing circuitry is further configured to:
   transmit the predicted collision zone to a device corresponding to at least one of: the first vehicle, the second vehicle, a third vehicle configured to transport the first or second vehicles, or a remote server.

18. The system of claim 9, wherein the first vehicle includes the ground collision awareness system.

19. The system of claim 9, wherein the first portion includes a taxiway comprising surface guidance markings, and wherein the second portion includes an airport apron region.

20. A non-transitory computer-readable storage medium having stored thereon instructions that, when executed, cause one or more processors to:
   enable, in response to a user input, a ground collision awareness system
   obtain historical navigation route data for one or more reference vehicles, the historical navigation route data being based on transponder positional data;
   identify a plurality of aerodrome guidance features for a particular aerodrome location, the aerodrome guidance features including guidance marker information fixed to a surface of the particular aerodrome location;
   determine a predicted path of a first vehicle, the predicted path comprising a first portion and a second portion, the first portion of the predicted path being predicted using the guidance marker information, and the second portion of the predicted path being predicted using the historical navigation route data;
   determine a predicted position of the first vehicle along the predicted path at a prospective time based on a machine learning model and trained on the historical navigation route data;
   determine a predicted position of a second vehicle with respect to approximately the same prospective time based on a machine learning model and trained on the historical navigation route data;
   perform a comparison of a first vehicle envelope for the first vehicle and a second vehicle envelope for the second vehicle at the predicted positions;
   identify an overlap of the first vehicle envelope and the second vehicle envelope; and
   determine a predicted collision zone of the first vehicle and the second vehicle at the prospective time based at least in part on the overlap of the first vehicle envelope and the second vehicle envelope and aerodrome guidance features;
   output, to a display device, an alert that includes an indication of the predicted collision zone.

\* \* \* \* \*